(12) United States Patent
Lim et al.

(10) Patent No.: US 10,958,330 B2
(45) Date of Patent: Mar. 23, 2021

(54) APPARATUS AND METHOD FOR ESTIMATING DIRECTION IN WIRELESS COMMUNICATION SYSTEM

(71) Applicants: Samsung Electronics Co., Ltd., Suwon-si (KR); POSTECH Research and Business Development Foundation, Pohang-si (KR)

(72) Inventors: Jongbu Lim, Suwon-si (KR); Hyeongtaek Lee, Pohang-si (KR); Junil Choi, Pohang-si (KR); Sucheol Kim, Pohang-si (KR); Myungkwang Byun, Suwon-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 16/727,459

(22) Filed: Dec. 26, 2019

(65) Prior Publication Data

US 2020/0212988 A1 Jul. 2, 2020

(30) Foreign Application Priority Data

Dec. 26, 2018 (KR) .................. 10-2018-0169807

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC .. H04B 1/0014; H04B 1/0017; H04B 1/0039; H04B 1/0042; H04B 1/005;
(Continued)

(56) References Cited

U.S. PATENT DOCUMENTS 10,420,090 B2 9/2019 Yoo et al.
2013/0059619 A1 3/2013 Kim et al.
(Continued)

FOREIGN PATENT DOCUMENTS

KR 10-2017-0019982 A 2/2017
WO 2018/183991 A1 10/2018

OTHER PUBLICATIONS

3GPP, 3rd Generation Partnership Project; Technical Specification Group Radio Access Network; NR; Physical layer procedures for data (Release 15), 3GPP TS 38.214 V15.7.0, Sep. 2019.
(Continued)

*Primary Examiner* — Young T. Tse
(74) *Attorney, Agent, or Firm* — Jefferson IP Law, LLP

(57) ABSTRACT

A communication system is provided. The communication system supports higher data rates Beyond 4th-Generation (4G) communication system such as Long Term Evolution (LTE). A first apparatus in a wireless communication system is provided. The apparatus includes an antenna array, at least one transceiver, and at least one processor. The transceiver is configured to transmit signals by using a beam set, and receive a signal for indicating at least one beam in the beam set from a second apparatus. The processor is configured to determine an auxiliary beam pair, based on the at least one beam. The transceiver is configured to transmit reference signals to the second apparatus by using the auxiliary beam pair, and receive feedback information relating to the auxiliary beam pair from the second apparatus. The at least one processor is configured to determine, based on the feedback
(Continued)

information, a communication direction relating to the second apparatus.

20 Claims, 22 Drawing Sheets

(51) Int. Cl.
    *H04L 27/26*     (2006.01)
    *H04B 7/0408*     (2017.01)

(52) U.S. Cl.
    CPC ......... *H04B 7/0626* (2013.01); *H04B 7/0632* (2013.01); *H04L 5/0048* (2013.01); *H04L 27/2613* (2013.01)

(58) Field of Classification Search
    CPC .......... H04B 1/0064; H04B 1/38; H04B 1/40; H04B 7/0408; H04B 7/0417; H04B 7/0426; H04B 7/061; H04B 7/0617; H04B 7/0619; H04B 7/0626; H04B 7/0632; H04B 7/0695; H04L 5/0048; H04L 5/006; H04L 27/2613; H04L 27/2646
    USPC ....... 375/219–222, 259, 260, 265, 267, 268, 375/271, 295, 299, 300, 302; 370/208, 370/278, 335, 337, 342, 344, 350; 455/456.1, 456.3, 456.5, 456.6, 67.13, 69, 455/70, 88

See application file for complete search history.

(56) References Cited

U.S. PATENT DOCUMENTS

| | | |
|---|---|---|
| 2014/0044044 A1 | 2/2014 | Morapakkam et al. |
| 2014/0323144 A1 | 10/2014 | Kim et al. |
| 2017/0207845 A1* | 7/2017 | Moon ................. H04B 7/0695 |
| 2018/0048360 A1 | 2/2018 | Athley et al. |
| 2018/0199212 A1* | 7/2018 | Lin ........................ H04B 7/005 |
| 2018/0254813 A1* | 9/2018 | Gao ..................... H04B 7/0632 |
| 2018/0302135 A1* | 10/2018 | Cheng ................ H04W 72/046 |
| 2019/0037530 A1* | 1/2019 | Han ..................... H04W 64/006 |
| 2019/0132828 A1* | 5/2019 | Kundargi .......... H04W 72/1205 |
| 2019/0150003 A1* | 5/2019 | He ......................... H04B 7/086 |
| | | 342/368 |
| 2019/0181941 A1* | 6/2019 | Kim .................... H04B 7/0695 |
| 2019/0356438 A1* | 11/2019 | Lee .................... H04B 7/0408 |
| 2020/0314906 A1* | 10/2020 | Goyal ............... H04W 74/0816 |

OTHER PUBLICATIONS

International Search Report dated Apr. 20, 2020, issued in International Application No. PCT/KR2019/018515.

* cited by examiner

APPARATUS AND METHOD FOR ESTIMATING DIRECTION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0169807, filed on Dec. 26, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH Research and Business Development Foundation.

BACKGROUND

1. Field

The disclosure relates to a wireless communication system. More specifically, the disclosure relates to an apparatus and method for estimating a direction in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to overcome the path loss problem due to the characteristic of an ultrahigh frequency band (e g mmWave), a 5G communication system is managed to increase signal gain by using a beamforming scheme. The direction of a transmitted or received signal is required to be more accurately determined to achieve smooth beamforming communication. Meanwhile, if the accuracy of direction estimation is increased by simply using a number of beams, the time required for direction determination may be increased.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for more accurately estimating the direction of a transmitted or received signal in a wireless communication system.

Another aspect of the disclosure is to provide an apparatus and method for estimating the direction of a signal at a low overhead in a wireless communication system.

Additional aspects will be set forth in part in the description which follows and, in part, will be apparent from the description, or may be learned by practice of the presented embodiments.

In accordance with an aspect of the disclosure, a first apparatus in a wireless communication system is provided. The apparatus includes an antenna array, at least one transceiver, and at least one processor, The at least one transceiver is configured to transmit signals by using a beam set, and receive a signal for indicating at least one beam in the beam set from a second apparatus, the at least one processor is configured to determine an auxiliary beam pair, based on the at least one beam. The at least one transceiver is configured to transmit reference signals to the second apparatus by using the auxiliary beam pair, and receive feedback information relating to the auxiliary beam pair from the second apparatus. The at least one processor is configured to determine, based on the feedback information, a communication direction relating to the second apparatus.

In accordance with another aspect of the disclosure, an operation method of a first apparatus in a wireless communication system is provided. The operation method includes transmitting signals by using a beam set, receiving a signal for indicating at least one beam in the beam set from a second apparatus, determining an auxiliary beam pair, based on the at least one beam, transmitting reference signals to the second apparatus by using the auxiliary beam pair, receiving feedback information relating to the auxiliary beam pair from the second apparatus, and determining, based on the feedback information, a communication direction relating to the second apparatus.

An apparatus and method according to various embodiments can more accurately determine the communication direction of a signal, which is required to achieve smooth beamforming communication.

An apparatus and method according to various embodiments can estimate a direction with a reduced overhead due to beam training by using an auxiliary beam pair.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Hereinafter, various embodiments will be described from the perspective of hardware. However, various embodiments include a technology that uses both hardware and software and thus, the various embodiments may not exclude the perspective of software.

Hereinafter, the disclosure relates to an apparatus and method for more accurately estimating the communication direction of a signal in a wireless communication system. Specifically, the disclosure includes a technology for obtaining information on a signal direction required for smooth communication, by using a beamforming scheme in a wireless communication system.

In the following description, terms including a term (e.g. signal, reference signal, information) indicating a signal, a term (e.g. base station, terminal, vehicle, and electronic device) indicating a communication node, a term indicating an element of an apparatus, and the like are exemplified for convenience of explanation. Accordingly, the disclosure is not limited to the following terms and other terms having the same technical meaning may be used.

In addition, the disclosure includes terms used in some communication protocols (e.g. 3rd generation partnership project (3GPP)) to explain various embodiments, but the terms merely correspond to examples. Various embodiments may be easily modified and then applied to another communication system.

Figure 1:
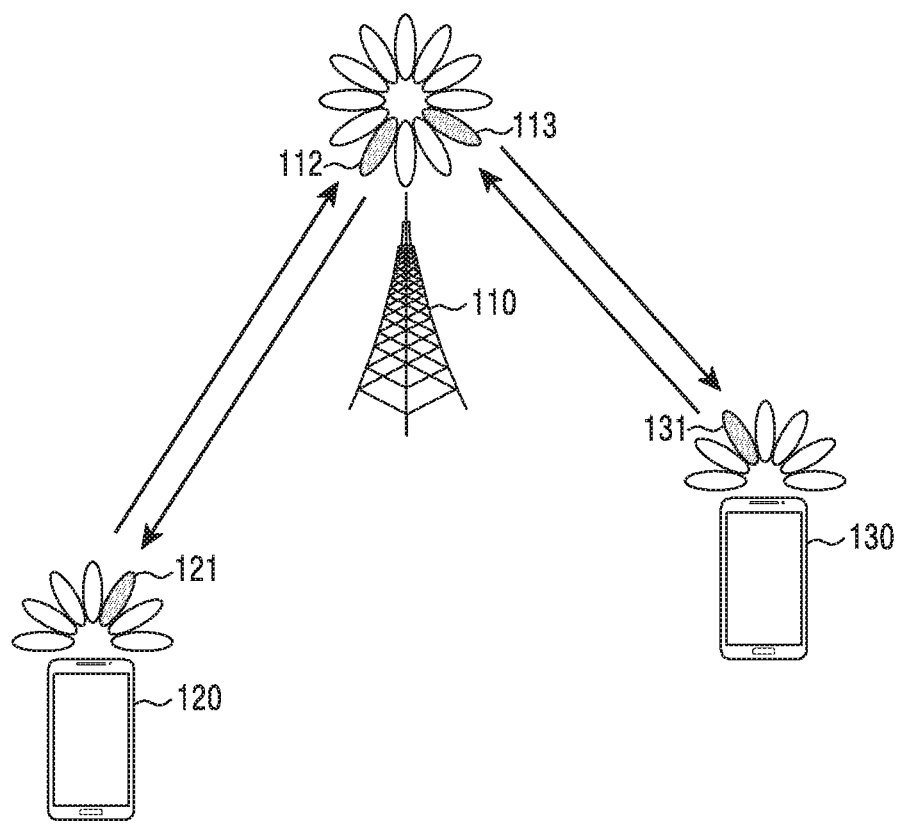
FIG. 1 illustrates a wireless communication system according to an embodiment of the disclosure.

FIG. 1 illustrates a wireless communication system according to an embodiment of the disclosure. Referring to FIG. 1 illustrates a base station 110, a terminal 120, and a terminal 130 as a part of nodes using wireless channels in a wireless communication system.

The base station 110 is a network infrastructure that provides wireless connection to the terminals 120 and 130.

The base station 110 has a coverage defined as a particular geographic area based on a distance by which the base station 110 can transmit a signal. The base station 110 may be called "an access point (AP)", "an eNodeB (eNB)", "a 5th generation node", "a wireless point", or another term having a technical meaning equivalent thereto. According to various embodiments, the base station 110 may be connected to at least one "transmission/reception point (TRP)". The base station 110 may transmit a downlink signal to the terminal 120 or 130 or receive an uplink signal therefrom through at least one TRP.

Each of the terminals 120 and 130 is an apparatus used by a user and communicates with the base station 110 through wireless channels. In some cases, at least one of the terminals 120 and 130 may be operated without involvement of a user. That is, at least one of the terminals 120 and 130 is an apparatus configured to perform machine-type communication (MTC) and may not be carried by a user. Each of the terminals 120 and 130 may be called "a user equipment (UE)", "a mobile station", "a subscriber station", "a customer premises equipment (CPE)", "a remote terminal", "a wireless terminal", "an electronic device", "a vehicle terminal", "a user device", or another term having a technical meaning equivalent thereto.

The base station 110 and the terminals 120 and 130 may transmit and receive a wireless signal in millimeter wave (mmWave) bands (e.g. 28 GHz, 30 GHz, 38 GHz, and 60 GHz). To improve the channel gain, the base station 110 and the terminals 120 and 130 may perform beamforming. Beamforming may include transmission beamforming and reception beamforming That is, the base station 110 and the terminals 120 and 130 may give directivity to a transmission signal or a reception signal. To this end, the base station 110 and the terminals 120 and 130 may select serving beams 112, 113, 121, and 131 through a beam search procedure or a beam management procedure. Communication after the serving beams 112, 113, 121, and 131 are selected may be performed through resources having a quasi-co-located (QCL) relationship with resources used for transmission of the serving beams 112, 113, 121, and 131.

If large-scale characteristics of a channel having transferred a symbol on a first antenna port can be inferred from a channel having transferred a symbol on a second antenna port, the first antenna port and the second antenna port may be considered to have a QCL relationship therebetween. For example, the large-scale characteristics may include at least one of delay spread, Doppler spread, Doppler shift, average gain, average delay, and spatial receiver parameter.

The base station 110 may transmit a signal to the terminal 120 by using a beam. The transmitted signal has a directivity characteristic, and thus the direction of the beam is required to be properly configured for smooth beamforming communication. The base station 110 may estimate a direction related to the terminal 120 and transmit a signal by using a beam corresponding to the estimated direction. A direction related to the terminal 120 means a direction in which a signal of the base station 110 is transmitted for the terminal 120, that is, an angle-of-departure (AoD) at which the signal starts, or means a direction in which a signal of the terminal 120 is received, that is, an angle-of-arrival (AoA) at which a signal arrives. Hereinafter, the disclosure describes a method for increasing communication efficiency by more accurately estimating a communication direction in which a signal is actually transmitted.

According to various embodiments, a beam means a spatial flow of a signal in a wireless channel and may be generated by one or more antennas (or antenna elements), and the generation process may be called beamforming According to various embodiments, an antenna array, etc. in which a plurality of antenna elements are concentrated, may be used, and in this case, a shape (i.e. coverage) according to a signal gain may have directivity. A beam used for signal transmission may be indicated by a transmission beam, or a beam used for signal reception may be indicated by a reception beam.

According to various embodiments, if an apparatus (base station or terminal) transmits a signal in the direction of a transmission beam, the signal gain of the apparatus may be increased. If a signal is transmitted by using a transmission beam, the signal may be transmitted through a spatial domain transmission filter of a signal transmission side, that is, a transmission node. If a signal is transmitted by using a plurality of transmission beams, the transmission node may transmit the signal while changing the spatial domain transmission filter. For example, if a signal is transmitted by an identical transmission beam, the transmission node may transmit the signal through the same spatial domain transmission filter. For example, if a terminal (UE) receives CSI-RSs for reception beam search (e.g. 3GPP TS 38.214 repetition='on'), the terminal may assume that the CSI-RSs are transmitted through the same spatial domain transmission filter.

According to various embodiments, if an apparatus (base station or terminal) receives a signal in the direction of a reception beam, the signal gain of the apparatus may be increased. If a signal is transferred by using a reception beam, the signal may be received through a spatial domain reception filter of a signal reception side, that is, a reception node. For example, if a terminal simultaneously receives several signals transmitted by using different beams, the terminal may receive the signals by using a single spatial domain reception filter, or may receive the signals by using multiple simultaneous spatial domain reception filters.

In addition, in the detailed description, according to various embodiments, a reference signal may be used as a signal transmitted by using a beam, and may include, for example, a demodulation-reference signal (DM-RS), a channel state information-reference signal (CSI-RS), a synchronization signal/physical broadcast channel (SS/PBCH), and a sounding reference signal (SRS). In addition, as a configuration of each reference signal, an IE such as a CSI-RS resource or a SRS-resource may be used, and a configuration described above may include beam-associated information. Beam-associated information may mean: whether a corresponding configuration (e.g. CSI-RS resource) uses a spatial domain filter identical to or different from that of another configuration (e.g. another CSI-RS resource in the same CSI-RS resource set); which reference signal the corresponding configuration is quasi-co-located (QCL) with; or if the corresponding configuration has been quasi-co-located (QCL), which QCL type (e.g. QCL type A, B, C, and D) the QCL corresponds to. QCL types may be defined as below.

"QCL-Type A": {Doppler shift, Doppler spread, average delay, delay spread}
"QCL-Type B": {Doppler shift, Doppler spread}
"QCL-Type C": {Doppler shift, average delay}
"QCL-Type D": {Spatial Rx parameter}

In the detailed description, according to various embodiments, a terminal may measure the quality of a beam in order to obtain a cell quality or a BWP quality. A terminal may obtain the quality of a beam, based on a CSI-RS or a SS/PBCH block.

For example, communication between a base station and a terminal has been described with reference to FIG. 1 as a system in which beamforming is operated, but various embodiments are not limited thereto. A direction estimation scheme in the disclosure may be applied to sidelink including device-to-device (D2D), vehicle-to-everything (V2X), etc.

In a multiple-input multiple output (MIMO) system using a plurality of antennas for a transmitter and/or a receiver, obtaining information for a channel is considered very important and has been researched for taking advantage of MIMO technology. Particularly, a beamforming communication system employing a MIMO technology is required to more accurately estimate the transmission direction or the reception direction (hereinafter, communication direction) of a signal, in other words, the angle (angle-of-departure, AoD) of a transmission signal and the angle (angle-of-arrival, AoA) of a reception signal.

Figure 2:
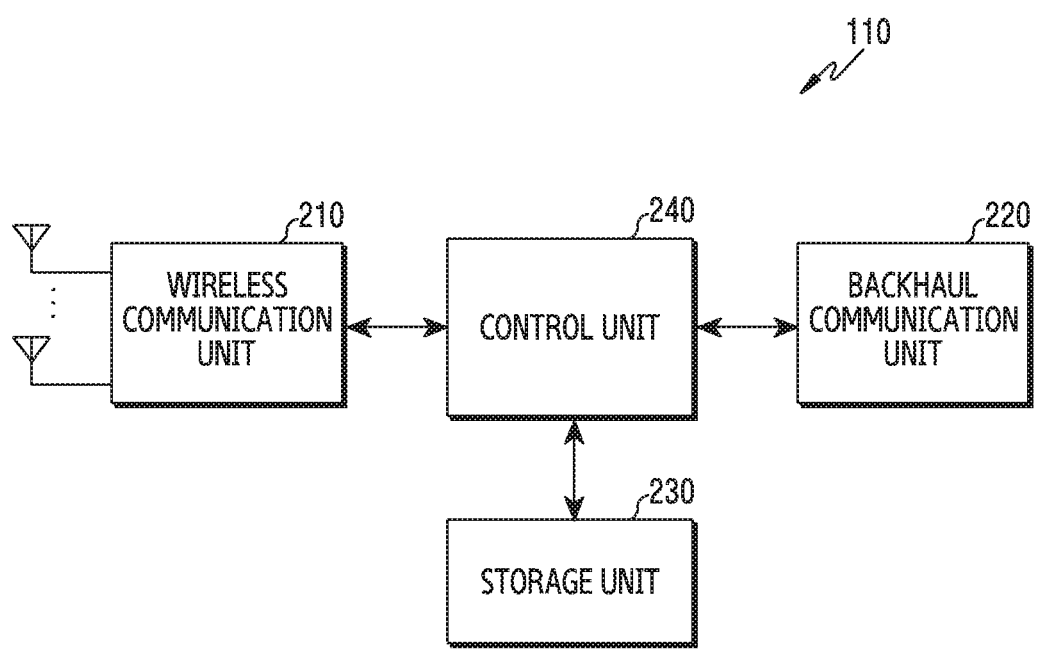
FIG. 2 illustrates a configuration of a base station in a wireless communication system according to an embodiment of the disclosure.

FIG. 2 illustrates a configuration of a base station in a wireless communication system according to an embodiment of the disclosure.

Referring to FIG. 2 may be understood as a configuration of the base station 110. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 2, the base station 110 includes a wireless communication unit 210, a backhaul communication unit 220, a storage unit 230, and a control unit 240.

The wireless communication unit 210 performs functions for transmitting or receiving a signal through a wireless channel. For example, the wireless communication unit 210 performs a function of conversion between a baseband signal and a bit stream according to a physical layer protocol of the system. For example, when data is transmitted, the wireless communication unit 210 generates complex symbols by encoding and modulating a transmission bit stream. Furthermore, when data is received, the wireless communication unit 210 reconstructs a reception bit stream by demodulating and decoding a baseband signal. Furthermore, the wireless communication unit 210 up-converts a baseband signal into a radio-frequency (RF) band signal and then transmits the converted RF band signal through an antenna, and down-converts an RF band signal received through an antenna into a baseband signal.

To this end, the wireless communication unit 210 may include a transmission filter, a reception filter, an amplifier, a mixer, an oscillator, a digital-to-analog converter (DAC), an analog-to-digital converter (ADC), and the like. Furthermore, the wireless communication unit 210 may include a plurality of transmission/reception paths. Further, the wireless communication unit 210 may include at least one antenna array configured by multiple antenna elements. In view of hardware, the wireless communication unit 210 may be configured by a digital unit and an analog unit, and the analog unit may include a plurality of sub-units according to operating power, operating frequency, etc.

The wireless communication unit 210 may transmit or receive a signal. For example, the wireless communication unit 210 may transmit a synchronization signal, a reference signal, system information, a message, control information, or data. In addition, the wireless communication unit 210 may perform beamforming. The wireless communication unit 210 may apply a beamforming weight to a transmitted or received signal in order to give the signal directivity based on a configuration of the control unit 240.

The wireless communication unit 210 may transmit and receive a signal as described above. Accordingly, the entirety or a part of the wireless communication unit 210 may be called "a transmission unit", "a reception unit", or "a transceiver unit". Furthermore, in the following description, transmission and reception through a wireless channel may be understood to include the aforementioned processing of the wireless communication unit 210.

The backhaul communication unit 220 provides an interface for performing communication with other nodes within a network. That is, the backhaul communication unit 220 converts, into a physical signal, a bit stream transmitted from the base station 110 to another node, for example, another access node, another base station, a higher node, a core network, etc., and converts a physical signal received from another node into a bit stream.

The storage unit 230 stores data such as a basic program, an application program, and configuration information for the operation of the base station 110. The storage unit 230 may be configured as a volatile memory, a non-volatile memory, or a combination of a volatile memory and a non-volatile memory. The storage unit 230 provides stored data in response to a request of the control unit 240. According to various embodiments, the storage unit 230 may store direction information (or may be called angle information) for each beam of an auxiliary beam pair (ABP) or each beam of a beam set to be operated in the base station 110. According to an embodiment, direction information may be expressed to be the type of an array response vector.

The control unit 240 controls overall operations of the base station 110. For example, the control unit 240 transmits and receives a signal through the wireless communication unit 210 or the backhaul communication unit 220. Further, the control unit 240 records and reads data in and from the storage unit 230. In addition, the control unit 240 may perform functions of a protocol stack required in a communication protocol. To this end, the control unit 240 may include at least one processor.

According to various embodiments, the control unit 240 may include a beam set determination unit (not shown), an auxiliary beam pair determination unit (not shown), and a direction determination unit (not shown). The beam set determination unit may determine a beam set for performing beam training. According to various embodiments, a beam of a beam set may have a beamwidth greater than that of a beam of an auxiliary beam pair described later. The auxiliary beam pair determination unit may determine an auxiliary beam pair for estimating a direction more accurately. The direction determination unit may estimate the direction, that is, the transmission angle or the reception angle of signals transmitted by using beams of an auxiliary beam pair, the estimation being based on feedback information on the signals. A procedure of estimating a direction in the disclosure may include a procedure of determining a suitable array response vector to be applied to an antenna array. The beam set determination unit, the auxiliary beam pair determination unit, and the direction determination unit may be: as a stored instruction set or code, an instruction/code that at least temporarily resides in the control unit 240; a storage space that stores the instruction/code; a part of circuitry configuring the control unit 240; or a module that performs a function of the control unit 240. According to various embodiments, the control unit 240 may control the base station 110 to perform operations according to various embodiments described later.

Figure 3:
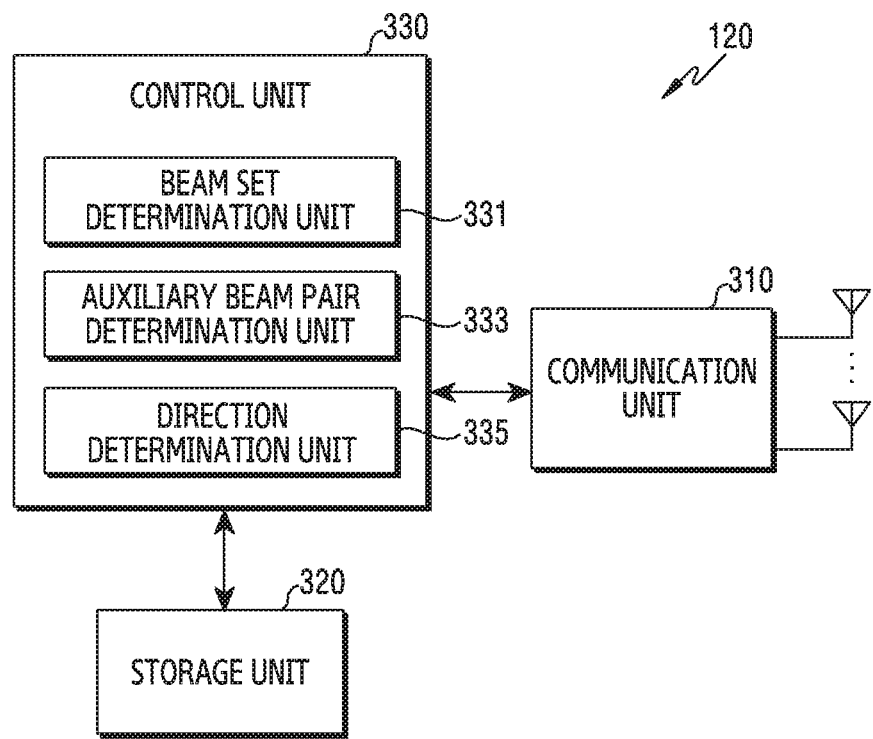
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood as a configuration of the terminal 120.

The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 3, the terminal 120 includes a communication unit 310, a storage unit 320, and a control unit 330.

The communication unit 310 performs functions for transmitting or receiving a signal through a wireless channel. For example, the communication unit 310 performs a function of conversion between a baseband signal and a bit stream according to a physical layer protocol of the system. For example, when data is transmitted, the communication unit 310 generates complex symbols by encoding and modulating a transmission bit stream. Furthermore, when data is received, the communication unit 310 reconstructs a reception bit stream by demodulating and decoding a baseband signal. Furthermore, the communication unit 310 up-converts a baseband signal into an RF band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Furthermore, the communication unit 310 may include a plurality of transmission/reception paths. Further, the communication unit 310 may include an antenna unit. The communication unit 310 may include at least one antenna array including a plurality of antenna elements. In view of hardware, the communication unit 310 may be configured by a digital circuit and an analog circuit (e.g. radio frequency integrated circuit (RFIC)). The digital circuit and the analog circuit may be implemented as a single package. Furthermore, the communication unit 310 may include a plurality of RF chains. Further, the communication unit 310 may perform beamforming. The communication unit 310 may apply a beamforming weight to a transmitted or received signal in order to give the signal directivity based on a configuration of the control unit 330. According to an embodiment, the communication unit 310 may include a radio frequency (RF) block (or RF unit). An RF block may include a first RF circuit (circuitry) related to an antenna and a second RF circuit (circuitry) related to baseband processing. The first RF circuit may be called an RF-A (antenna). The second RF circuit may be called an RF-B (baseband).

In addition, the communication unit 310 may transmit or receive a signal. The communication unit 310 may receive a downlink signal. A downlink signal may include a synchronization signal (SS), a reference signal (RS) (e.g. cell-specific reference signal (CRS) and demodulation (DM)-RS), system information (e.g. MIB, SIB, remaining system information (RMSI), other system information (OSI)), a configuration message, control information, or downlink data. In addition, the communication unit 310 may transmit an uplink signal. An uplink signal may include a random access-related signal (e.g. random access preamble (RAP) (or message 1 (Msg 1), message 3 (Msg 3)), a reference signal (e.g. sounding reference signal (SRS)), DM-RS, or the like. In addition, the communication unit 310 may include different communication modules to process signals in different frequency bands. Further, the communication unit 310 may include a plurality of communication modules for supporting a plurality of different wireless connection technologies. For example, different wireless connection technologies may include Bluetooth low energy (BLE), wireless fidelity (Wi-Fi), WiFi gigabyte (WiGig), a cellular network (e.g. long term evolution (LTE) and new radio (NR)), and the like. Further, different frequency bands may include a super high frequency (SHF) (e.g. 2.5 GHz and 5 GHz) band and a millimeter (mm) wave (e.g. 38 GHz, 60 GHz) band. In addition, the communication unit 310 may use the same type of wireless connection technology for different frequency bands (e.g. an unlicensed band for licensed assisted access (LAA), and citizens broadband radio service (CBRS) (e.g. 3.5 GHz)).

The communication unit 310 transmits and receives a signal as described above. Accordingly, the entirety or a part of the communication unit 310 may be called "a transmission unit", "a reception unit", or "a transceiver unit". Furthermore, in the following description, transmission and reception through a wireless channel may be understood to include the aforementioned processing of the communication unit 310.

The storage unit 320 stores data such as a basic program, an application program, and configuration information for the operation of the terminal 120. The storage unit 320 may be configured as a volatile memory, a non-volatile memory, or a combination of a volatile memory and a non-volatile memory. The storage unit 320 provides stored data in response to a request of the control unit 330. According to various embodiments, the storage unit 320 may store direction for each beam of an auxiliary beam pair or each beam of a beam set to be operated in the terminal 120.

The control unit 330 controls overall operations of the terminal 120. For example, the control unit 330 transmits and receives a signal through the communication unit 310. Further, the control unit 330 records and reads data in and from the storage unit 320. In addition, the control unit 330 may perform functions of a protocol stack required in a communication protocol. To this end, the control unit 330 may include at least one processor or microprocessor, or may be a part of a processor. Furthermore, the control unit 330 and a part of the communication unit 310 may be called a communication processor (CP). The control unit 330 may include various modules for performing communication.

According to various embodiments, the control unit 330 may include a beam set determination unit 331, an auxiliary beam pair determination unit 333, and a direction determination unit 335. The beam set determination unit 331, the auxiliary beam pair determination unit 333, and the direction determination unit 335 correspond to the beam set determination unit, the auxiliary beam pair determination unit, and the direction determination unit of the control unit 240, described above. The beam set determination unit 331, the auxiliary beam pair determination unit 333, and the direction determination unit 335 may be: as an instruction set or code stored in the storage unit 320, an instruction/code that at least temporarily resides in the control unit 330; a storage space that stores the instruction/code; a part of circuitry configuring the control unit 330; or a module that performs a function of the control unit 330. According to various embodiments, the control unit 330 may control the terminal to perform operations according to various embodiments described later.

The configuration of the terminal illustrated in FIG. 3 merely corresponds to an example of a terminal, and a terminal is not limited to the configuration illustrated in FIG. 3. That is, according to various embodiments, a part of the configuration may be added, removed, or changed.

Figure 4A:
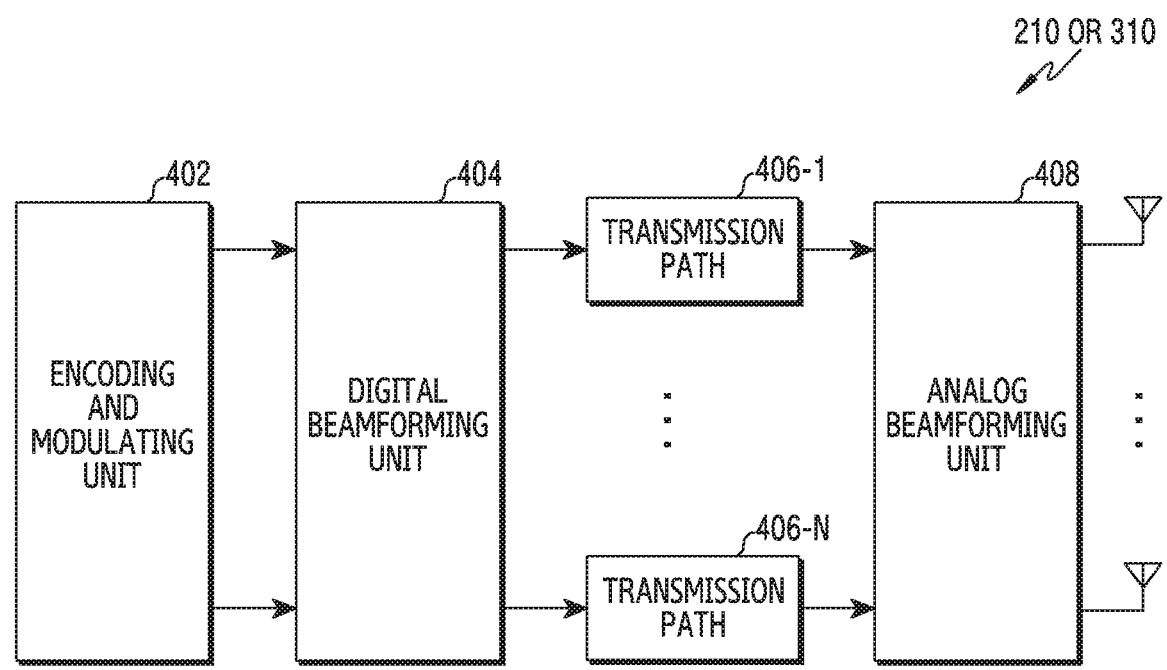
FIG. 4A illustrates a configuration of a communication unit in a wireless communication system according to an embodiment of the disclosure.

FIG. 4A illustrates a configuration of a communication unit in a wireless communication system according to an embodiment of the disclosure.

Figure 4B:
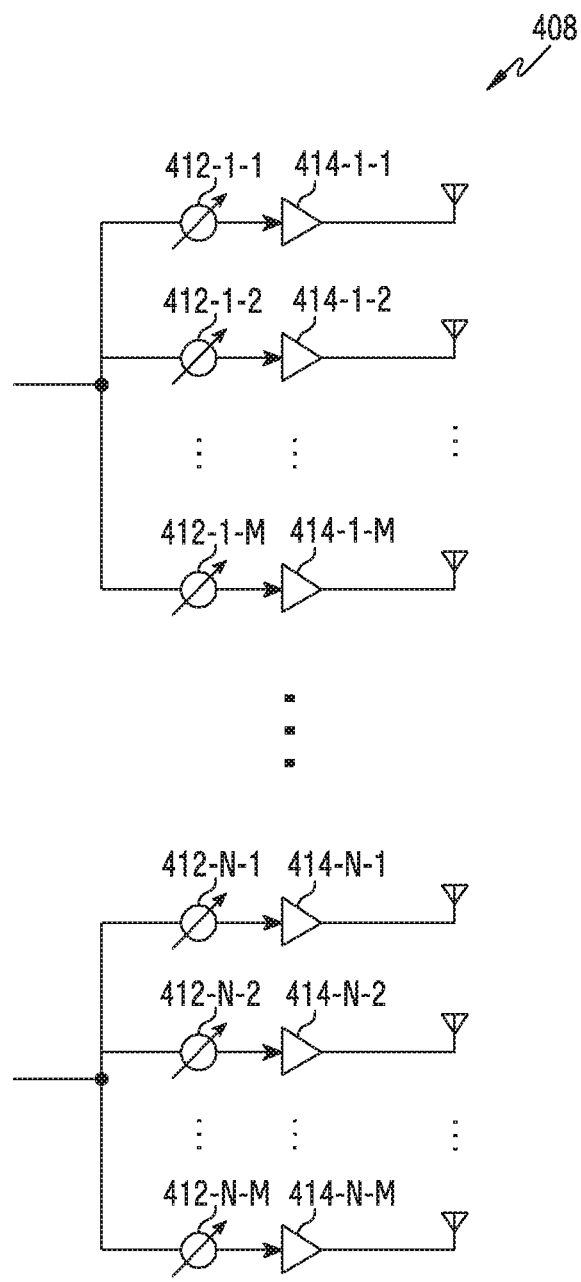
FIG. 4B illustrates a configuration of a communication unit in a wireless communication system according to an embodiment of the disclosure.

FIG. 4B illustrates a configuration of a communication unit in a wireless communication system according to an embodiment of the disclosure.

Figure 4C:
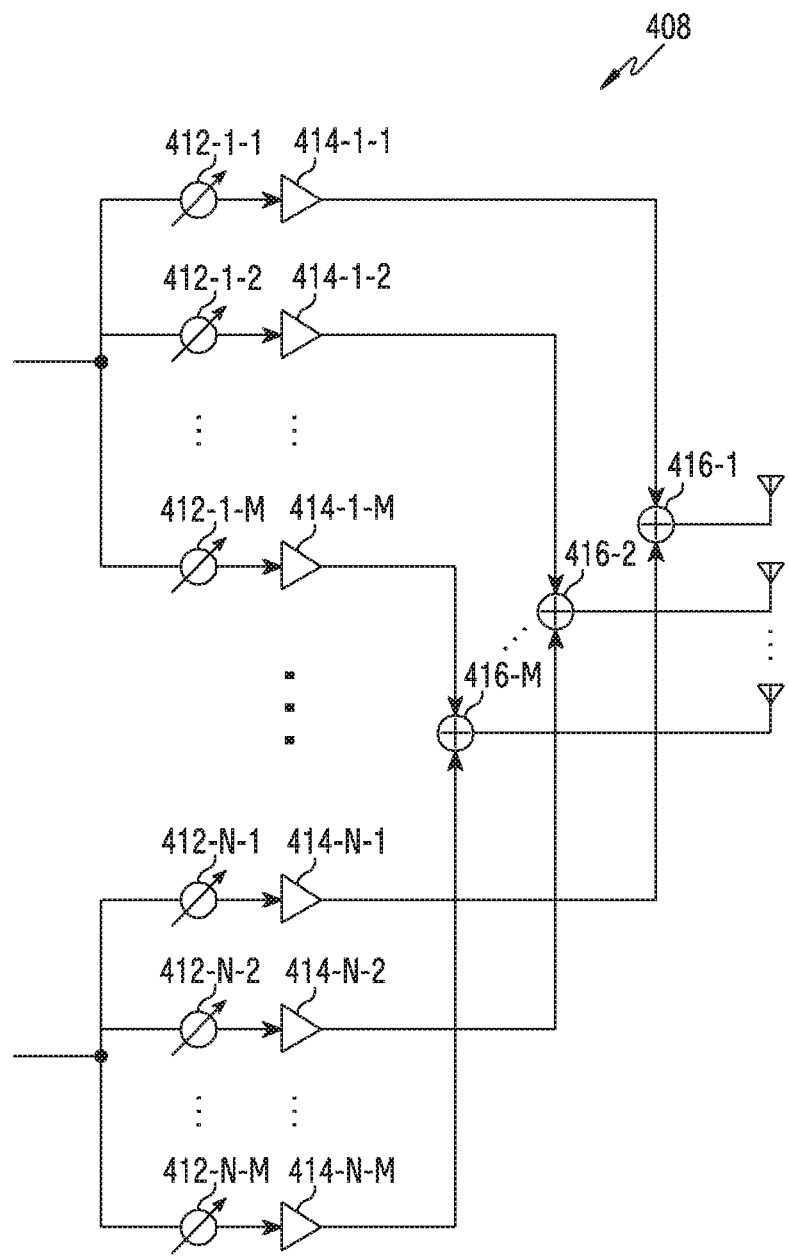
FIG. 4C illustrates a configuration of a communication unit in a wireless communication system according to an embodiment of the disclosure.

FIG. 4C illustrates a configuration of a communication unit in a wireless communication system according to an embodiment of the disclosure. FIGS. 4A, 4B and 4C illustrates an example of a specific configuration of the wireless communication unit 210 illustrated in FIG. 2 or the communication unit 310 illustrated in FIG. 3. Specifically, FIGS. 4A, 4B and 4C illustrate elements performing beamforming, which are a part of the wireless communication unit 210 in FIG. 2 or the communication unit 310 in FIG. 3.

Referring to FIG. 4A, the wireless communication unit 210 or the communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For channel encoding, at least one of a low density parity check (LDPC) code, a convolution code, and a polar code may be used. The encoding and modulating unit 402 generates modulation symbols by performing constellation mapping.

The digital beamforming unit 404 performs beamforming on a digital signal (e.g. modulation symbols). To this end, the digital beamforming unit 404 multiplies beamforming weights to the modulation symbols. Beamforming weights are used for changing the size and the phase of a signal, and may be called "a precoding matrix", "a precoder", etc. The digital beamforming unit 404 outputs, to the plurality of transmission paths 406-1 to 406-N, the modulation symbols, which have been subjected to digital beamforming According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert, into analog signals, digital signals having been subjected to digital beamforming. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is designed for an orthogonal frequency division multiplexing (OFDM) scheme, and may be excluded in another physical layer scheme (e.g. filter bank multi-carrier (FBMC)). That is, the plurality of transmission paths 406-1 to 406-N provide independent signal processing processes for multiple streams generated through digital beamforming, respectively. However, according to an implementation method, a part of the elements of the plurality of transmission paths 406-1 to 406-N may be shared.

The analog beamforming unit 408 performs beamforming on an analog signal. To this end, the digital beamforming unit 404 multiplies beamforming weights to analog signals. The beamforming weights are used for changing the size and the phase of a signal. Specifically, according to a connection structure between the plurality of transmission paths 406-1 to 406-N and antennas, the analog beamforming unit 408 may be configured as illustrated in FIG. 4B or FIG. 4C.

Referring to FIG. 4B, signals input to the analog beamforming unit 408 undergo phase/size conversion and an operation of amplification, and are then transmitted through antennas. The signals in the paths are transmitted through different antenna sets, that is, antenna arrays. In relation to processing of a signal input through a first path, the signal is converted into a signal stream including signals having an identical phase or size or different phases or sizes by phase/size conversion units (412-1-1 to 412-1-M) to (412-N-1 to 412-N-M), the converted signals included in the signal stream are amplified by amplifiers (414-1-1 to 414-1-M) to (414-N-1 to 414-N-M), and then the amplified signals are transmitted through antennas, respectively.

Referring to FIG. 4C, signals input to the analog beamforming unit 408 undergo phase/size conversion and an operation of amplification, and are then transmitted through antennas. The signals in the paths are transmitted through an identical antenna set, that is, an antenna array. In relation to processing of a signal input through a first path, the signal is converted into a signal stream including signals having an identical phase or size or different phases or sizes by phase/size conversion units 412-1-1 to 412-1-M, and the converted signals included in the signal stream are amplified by amplifiers 414-1-1 to 414-1-M. In order to be transmitted through a single antenna array, amplified signals are added together based on antenna elements by adding units 416-1-1 to 416-1-M, and then the added signals are transmitted through the antennas, respectively.

FIG. 4B illustrates an example of using independent antenna arrays for transmission paths, and FIG. 4C illustrates an example of sharing a single antenna array between transmission paths. However, according to another embodiment, some transmission paths may use independent antenna arrays, and the remaining transmission paths may share a single antenna array. Further, according to yet another embodiment, a switchable structure between transmission paths and antenna arrays may be applied thereby allowing use of a structure which is changeable adaptively according to a situation.

FIGS. 1 to 4C illustrate a configuration example of a communication environment, a base station, or a terminal for direction estimation according to various embodiments. Hereinafter, operations of an apparatus for direction estimation according to various embodiments will be described with reference to FIGS. 5 and 6.

In order to explain direction estimation of the disclosure, a first apparatus will be described with an example of estimating the direction of a signal to be transmitted from the first apparatus to a second apparatus. That is, the first apparatus may be a transmission apparatus, and the second apparatus may be a reception apparatus. The estimated communication direction described above is a direction for increasing the communication quality between the first apparatus and the second apparatus, and may indicate an AoD.

A grid-of-beam (GoB) scheme may be used as a method for estimating the transmission direction (e.g. AoD) or the reception direction (e.g. AoA) of a signal, required for communication. According to a GoB scheme, the first apparatus may identify a beam having the highest signal quality (e.g. reference signal received power (RSRP)) among a plurality of beams of the first apparatus, and may determine a reference direction (e.g. boresight) of the identified beam to be an AoD. In order to increase the accuracy of an angle estimated in a GoB scheme, that is, increase the resolution of an estimated direction, beams having narrow beamwidths may be used. As the number of antennas of the first apparatus, which is used for beamforming, is increased, beams having narrower beamwidths may be generated. However, the narrower a beamwidth, the greater the number of beams including the same coverage, and thus a GoB scheme, by which a direction is estimated through exhaustive search for all the beams, may increase the overhead due to beam training for many beams.

Unlike a GoB scheme for satisfying resolution by simply operating beams having narrow beamwidths, a scheme using an auxiliary beam pair (ABP) to obtain high resolution may be considered. The first apparatus may form a plurality of beams. The first apparatus may perform beam training by using the plurality of beams. The first apparatus may transmit a signal to the second apparatus, which is an opposite apparatus, by using each of the plurality of beams and may receive feedback on the transmitted signal from the second apparatus. In a scheme using an ABP, a direction (angle) is estimated by using a pair of beams including a first beam having the greatest reception power (e.g. RSRP), and a second beam having greater reception power among two beams adjacent to the first beam. The plurality of beams preformed in the first apparatus may include the first beam and the second beam. The first apparatus may identify the first beam and the second beam among the plurality of beams through beam training. The first apparatus may estimate the communication directions of the two beams through direction information of the two beams and power information of the two beams. Unlike a GoB scheme of determining a reference direction of a beam having the greatest reception power to be an AoD, the first apparatus may use an auxiliary beam pair to obtain, as an AoD, a direction located between a reference direction of a first beam and a reference direction of a second beam different from the first beam. Therefore, the first apparatus can more accurately estimate the direction of a signal, compared to a GoB scheme providing fixed resolution according to the number of beams. A scheme described above may be called a GoB-based ABP scheme.

However, even a GoB-based ABP scheme may have an error estimated between an actual communication direction and an estimated communication direction. Although the direction of an actual signal is close to the reference direction of a first beam, a second beam adjacent to the first beam may be used, whereby an error (hereinafter, estimation error) between the optimal direction of the actual signal and an estimated direction may be caused. This phenomenon may especially stand out at a high signal-to-noise ratio (SNR). In order to reduce estimation error described above, the disclosure proposes a direction estimation scheme through two stages of identifying a beam through beam training and then determining a communication direction by using an auxiliary beam pair that is symmetrical about the direction of the identified beam. A direction estimation scheme through two stages may be called a two-stage direction estimation scheme, a two-stage angle estimation scheme, a two-stage beamforming-based direction estimation scheme, a two-stage beam training-based direction estimation scheme, a beam reconfiguration scheme, etc.

Two-Stage Direction Estimation Scheme

Figure 5:
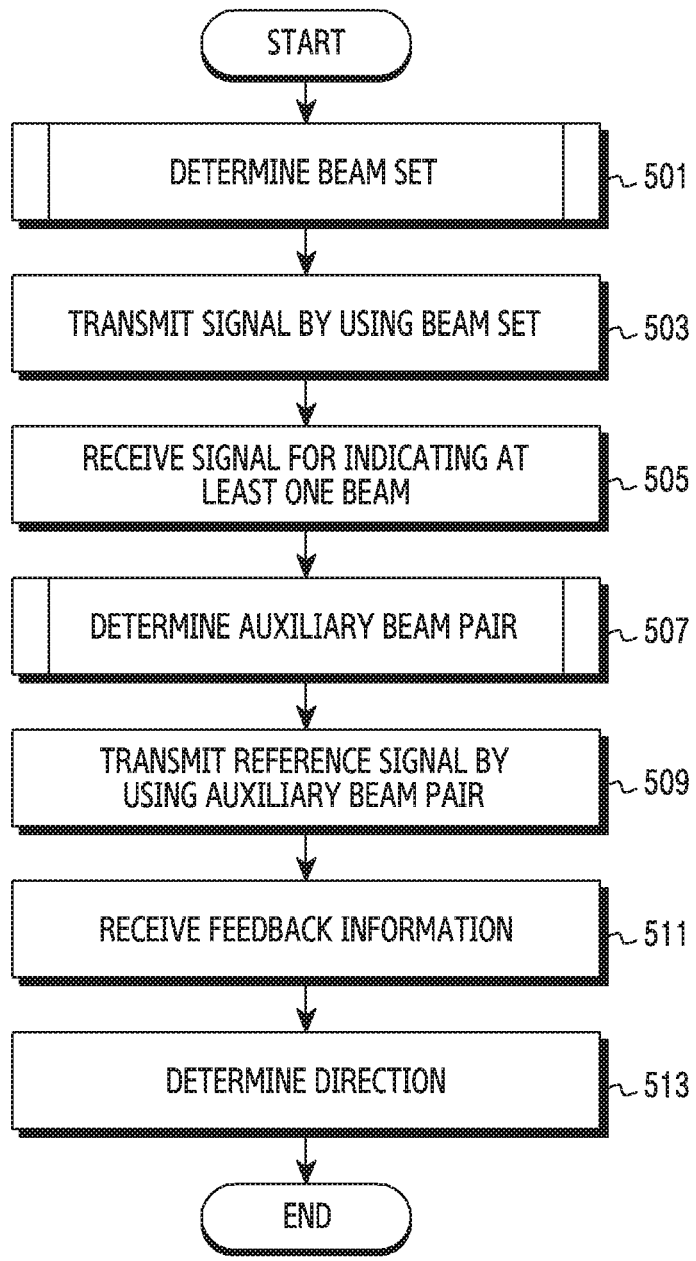
FIG. 5 illustrates a flowchart of a first apparatus for direction estimation according to an embodiment of the disclosure.

FIG. 5 illustrates a flowchart of a first apparatus for direction estimation according to an embodiment of the disclosure. A first apparatus may include the base station 110 or the terminal 120. A second apparatus may include the base station 110 or the terminal 120.

Referring to FIG. 5, in operation 501, the first apparatus may determine a beam set. The first apparatus may determine a beam set for beam training. Beam training may mean a procedure of sequentially transmitting, by a particular apparatus (e.g. base station 110), signals to an opposite apparatus by using different beam directions, thereby identifying a beam suitable for communicating with the opposite apparatus (e.g. another terminal 120) among a plurality of beams of the beam set. A beam of a beam set according to various embodiments has a beamwidth greater than a beam of an auxiliary beam pair described below, and thus may be called a wide beam set.

As the number of beams included in a beam set is increased, the accuracy of a direction in which the second apparatus is positioned may be increased. This is because an increase in the number of beams used for beam training may increase the resolution of direction. Meanwhile, the greater the number of beams used for beam training, the greater the number of signals transmitted for the beam training, and thus the overhead for estimation of communication direction is increased. On the contrary, if the number of beams included in a beam set is decreased, the accuracy of direction estimation may be decreased. This is because a decrease in the number of beams used for beam training may reduce the resolution of direction. Similarly, the smaller the number of beams used for beam training, the smaller the number of signals transmitted for the beam training, and thus the overhead for finding a communication direction is decreased. Therefore, the first apparatus is required to determine a proper beam set in consideration of both accuracy improvement and the overhead due to beam training.

According to various embodiments, the first apparatus may determine a beam set including beams generated to have a designated beamwidth. The designated beamwidth means that the beamwidth of each beam of the beam set satisfies a particular condition. The particular condition may be related to a beam gap of an auxiliary beam pair. The particular condition may be designed to satisfy the periodicity of phase to allow vectors of an auxiliary beam pair to be simplified and then expressed at the time of angle estimation using the auxiliary beam pair. The first apparatus may determine a beam set, based on the number of antennas of an antenna array. According to an embodiment, a beamwidth may be a half power beamwidth (HPBW). A beamwidth may be defined as the angle between two directions having a radiation power strength that is half the maximum value in the cross section of a pattern including a radiation beam direction.

According to various embodiments, the first apparatus may determine a beamwidth, based on a beam gap between the beams of auxiliary beam pairs. A beam gap may mean the angle which the center directions of beams physically make. In order to configure an auxiliary beam pair with a particular angle, the first apparatus may determine a beamwidth, based on the particular angle. The reason of the determination is to determine an auxiliary beam pair, based on a reference beam.

According to various embodiments, the first apparatus may determine a beam set, based on a beamwidth and a coverage that the first apparatus is to provide. A coverage may include the direction range of a signal to be transmitted through beamforming. In a fixed coverage, the wider the beamwidth, the smaller the number of the beams in a beam set. On the contrary, in a fixed coverage, the narrower the beamwidth, the greater the number of the beams in a beam set.

In operation 503, the first apparatus may transmit a signal by using the beam set. The beam set may include a plurality of beams. The plurality of beams may indicate different directions, respectively. The first apparatus may transmit a signal by using each of the plurality of beams. The first apparatus may repeatedly transmit a signal by sequentially using beams having different beam directions in the beam set. For example, the first apparatus may perform beam sweeping.

The signal may be a beamformed signal. According to various embodiments, a beamformed signal may include a synchronization signal. For example, a synchronization signal may be at least one among a primary synchronization signal (PSS), a secondary synchronization signal (SSS), and an extended synchronization signal (ESS). In addition, for example, a synchronization signal may be an SS block. According to various embodiments, a beamformed signal may include a reference signal. For example, a reference signal may be at least one among a BRS, a beam refinement reference signal (BRRS), a cell-specific reference signal (CRS), a channel state information-reference signal (CSI-RS), and a demodulation-reference signal (DM-RS).

In operation 505, the first apparatus may receive a signal for indicating at least one beam. The first apparatus may receive a signal for indicating at least one beam among the beams in the beam set from the second apparatus. The second apparatus may receive the signal that is transmitted in operation 503. The second apparatus may receive the signals which are transmitted by using different beams in operation 503, and may measure the received signals.

In the disclosure, a metric for measurement of signals may be at least one of, for example, beam reference signal received power (BRSRP), RSRP, reference signal received quality (RSRQ), received signal strength indicator (RSSI), signal to interference and noise ratio (SINR), carrier to interference and noise ratio (CINR), SNR, error vector magnitude (EVM), bit error rate (BER), block error rate (BLER). In addition to the described examples, other terms having the same technical meaning as the examples or other metrics indicating channel quality can be also used. In the disclosure, high channel quality means that the channel quality related to a signal size is high, or the channel quality related to an error rate is low. It may mean that as a channel quality is increased, smooth wireless communication environment is ensured. Furthermore, an optimal beam may indicate a beam having the highest channel quality among beams. Hereinafter, an example wherein a channel quality determining the size of a beamforming signal is RSRP will be described.

On the basis of a measurement result, the second apparatus may transmit a signal for indicating at least one beam among the plurality of beams to the first apparatus. The second apparatus may transmit, to the first apparatus, a signal indicating a beam (or resource) corresponding to a signal measured to have the highest channel quality among the signals, that is, a beam providing the best channel state. For example, the second apparatus may feedback a reference signal having the highest RSRP among a plurality of reference signals to the first apparatus.

The first apparatus may determine a beam that is relatively suitable for communicating with the second apparatus among the plurality of beams in the beam set, by receiving a signal for indicating at least one beam from the second apparatus. In some embodiments, the second apparatus may transmit feedback information including information indicating the at least one beam to the first apparatus. The feedback information may explicitly indicate at least one beam. For example, the feedback information may include resources of a CSI-RS. In some other embodiments, the first apparatus may receive a particular signal on a resource region for indicating the at least one beam. The particular signal may implicitly indicate at least one beam. For example, the particular signal may include a random access preamble.

In operation 507, the first apparatus may determine an auxiliary beam pair. In various embodiments, an auxiliary beam pair may means a beam pair used for accurately estimating the direction (hereinafter, communication direction) of a physical path of a signal, which is required for communication between the apparatus (e.g. first apparatus) and the opposite apparatus (e.g. second apparatus). On the basis of the channel quality (e.g. reception power (RSRP)) of each of two beams of the auxiliary beam pair, the first apparatus can more accurately estimate a communication direction located between the directions of the two beams.

The first apparatus may identify a reference beam among the beams in the beam set. In order to determine a reference beam, the first apparatus may obtain information relating to the at least one beam, which is received from the second apparatus in operation 505. The first apparatus may identify a reference beam among the at least one beam. According to various embodiments, the at least one beam may be identified among the plurality of beams in the beam set according to channel quality. The first apparatus may determine a beam having the highest channel quality among the plurality of beams in the beam set. This is because the direction of a beam providing higher channel quality is similar to a communication direction. The first apparatus may determine a beam corresponding to the highest channel quality as a reference beam.

The first apparatus may determine the direction of the reference beam as a reference direction. The direction of the reference beam may mean the center direction of the reference beam. For example, the direction of the reference beam may be determined to be a boresight direction, that is, a direction corresponding to a main lobe in a radiation pattern of an antenna forming the reference beam. The first apparatus may determine two beams symmetrical about the reference direction, to be an auxiliary beam pair.

According to various embodiments, the first apparatus may determine, as a beam pair, two beams corresponding to two directions which are symmetric about the reference direction. In other words, the two beams of the auxiliary beam pair may be symmetrical about the center direction of the reference beam obtained through operations 503 to 505. The first apparatus may reform beams to be symmetric about the reference direction, rather than using the beams in the beam set. In other words, the auxiliary beam pair according to various embodiments may be different from the beams in the beam set. Each beam of the auxiliary beam pair may have a boresight direction different from those of the beams in the beam set.

According to various embodiments, the first apparatus may newly determine a beam set for determining an auxiliary beam pair on the basis of the determined reference direction, rather than identifying beams for the auxiliary beam pair among the beams in the beam set that is determined in operation 501. After that, the first apparatus may determine an auxiliary beam pair from beams in the newly determined beam set. The beam set of operation 501 may be called a primary beam set. Beams of at least one auxiliary beam pair may be called a secondary beam set. A procedure of transmitting a reference signal and receiving, as feedback, reception power of the reference signal may be also considered to be an example of beam training, and thus the beams of at least one auxiliary beam pair may be called a secondary beam set to distinguish from the beam set of operation 501.

According to various embodiments, the first apparatus may determine, as an auxiliary beam pair, beams providing two directions which are symmetric to each other among directions having a designated angle with the reference direction. The auxiliary beam pair may be determined based on a beamwidth of the beam set determined in operation 501. When the beam set is determined, a beam gap of the auxiliary beam pair is considered to determine the beamwidth. Therefore, the first apparatus may determine an auxiliary beam pair, based on the beamwidth of the reference beam. According to an embodiment, the first apparatus may determine an auxiliary beam pair such that the beamwidth of the reference beam is identical to the beam gap of the auxiliary beam pair. According to another embodiment, the first apparatus may determine an auxiliary beam pair such that the beamwidth of the reference beam is a multiple of the beam gap of the auxiliary beam pair. According to yet another embodiment, the first apparatus may determine an auxiliary beam pair such that the beam gap of the auxiliary beam pair is a multiple of the beamwidth of the reference beam. That is, the first apparatus may determine an auxiliary beam pair, based on an angle between the reference direction and the direction of each of beams symmetric about the reference direction, rather than being simply based on the beams symmetrical about the reference direction. Two times the angle may correspond to the beam gap between the beams of the auxiliary beam pair. In other words, the first apparatus may determine an auxiliary beam pair, based on a designated beam gap. In some embodiments, the first apparatus may designate a beam gap, based on the number of antennas of an antenna array used to form the beams of an auxiliary beam pair.

In operation 509, the first apparatus may transmit a reference signal by using the auxiliary beam pair. The auxiliary beam pair may include a beam pair of the first apparatus. The beam pair may include two beams of the first apparatus. Hereinafter, for convenience of explanation, a two-stage direction estimation scheme of the disclosure will be described by using a single auxiliary beam pair, but the disclosure is not limited thereto. In order to perform a two-stage direction estimation scheme, a plurality of auxiliary beam pairs may be used.

An auxiliary beam pair may include a first beam of the first apparatus and a second beam of the first apparatus. A communication angle may be positioned between the first beam and the second beam. The first apparatus may transmit a reference signal by using each of the first beam and the second beam, in order to estimate an accurate communication angle. The first apparatus may transmit a first reference signal by using the first beam. The second apparatus may transmit a second reference signal by using the second beam. Each of the used reference signals may be at least one of a BRS, a BRRS, a CRS, a CSI-RS, and a DM-RS.

According to various embodiments, the beamwidth of each beam of an auxiliary beam pair may be smaller than that of each beam of the beam set determined in operation 501. That is, the beamwidth of the first beam or the second beam may be smaller than that of each of the plurality of beams in the beam set. After beam training through the beam set, an auxiliary beam pair may be used to perform more accurate angle estimation.

In operation 511, the first apparatus may receive feedback information. The first apparatus may receive feedback information relating to the auxiliary beam pair. The first apparatus may receive feedback information relating to the first beam. The feedback information may include a channel quality relating to the first beam. For example, the feedback information may include a reception power value of a first reference signal transmitted by using the first beam. According to an example, the feedback information may include the RSRP of the first reference signal. The first apparatus may receive feedback information relating to the second beam. The feedback information may include a channel quality relating to the second beam. For example, the feedback information may include a reception power value of a second reference signal transmitted by using the second beam. According to an example, the feedback information may include the RSRP of the second reference signal.

The first apparatus may obtain a channel quality relating to the first beam and a channel quality relating to the second beam by using various methods. In some embodiments, feedback information relating to the first beam and feedback information relating to the second beam may be fed back, as a message, through one-time signaling. In some other embodiments, feedback information relating to the first beam and feedback information relating to the second beam may be transmitted as independent signals, respectively.

In operation 513, the first apparatus may determine a direction. According to various embodiments, the first apparatus may determine a communication direction, based on direction information of the reference beam. Because the reference beam provides the highest channel quality among the beams in the beam set of operation 501, the direction of the reference beam among the beams in the beam set may have the smallest error compared to a communication direction. The first apparatus may obtain direction information relating to the reference direction. The direction information relating to the reference direction may include an absolute direction vector of a physical signal path generated by the reference beam.

The first apparatus may determine a direction, based on the feedback information. The direction may correspond to an optimal angle for allowing the first apparatus to communicate with the second apparatus. The optimal angle may mean a communication direction providing an optimal communication quality. The communication direction may be related to a physical path of a signal for optimal communication between the first apparatus and the second apparatus. For example, the communication direction may mean the AoD (or AoA) of a signal of the first apparatus, which is required for the first apparatus to smoothly communicate with the second apparatus. In the disclosure, the determination of a communication direction may be expressed as the estimation of a communication direction, the estimation of an angle, the determination of a communication angle, etc. A determined communication direction may be expressed based on a vector of an antenna array that forms a beam in the direction.

According to various embodiments, the first apparatus may determine a communication direction, based on a channel quality (e.g. first RSRP) relating to the first reference signal and a channel quality (e.g. second RSRP) relating to the second reference signal. A communication direction for the second apparatus may be positioned between a direction in which the first reference signal is transmitted and a direction in which the second reference signal is transmitted. The first apparatus may determine a communication direction, based on direction information and channel quality information (e.g. first RSRP and second RSRP) of the auxiliary beam pair.

Although not illustrated in FIG. 5, the first apparatus may perform beamforming communication with the second apparatus on the basis of an obtained communication direction. The first apparatus may form at least one beam corresponding to the communication direction. The first apparatus may transmit data to the second apparatus by using a beam corresponding to the communication direction. The first apparatus can increase the quality of beamforming communication with the second apparatus by obtaining more accurate communication direction (communication angle). In addition, the first apparatus can reduce the overhead due to beam training by identifying at least one beam among beams for the beam training on the basis of the obtained communication direction.

In FIG. 5, a reference signal is described as an example of a signal transmitted by using an auxiliary beam pair, but the disclosure is not limited thereto. According to an embodiment, a synchronization signal may be used instead of a reference signal, or a beamformed signal including data may be used for direction estimation using an auxiliary beam pair. According to an embodiment, a wide beam, such as a SS/PBCH block, may be used for a beam set, and a CSI-RS may be used for transmission of a reference signal through an auxiliary beam pair. A relatively narrow beamwidth can derive minute direction determination.

In FIG. 5, operations 501 to 513 are sequentially described, but some operations may be described together, or some operations may be omitted according to an embodiment. That is, the embodiments in the disclosure are not interpreted limitedly to the order/operations illustrated in the flowchart. According to an embodiment, beam information for determination of an auxiliary beam pair may be obtained through another scheme (e.g. AoA estimation using an uplink reference signal (e.g. SRS), beam information used before, history, etc., beam information (e.g. SRS resource ID, CSI-RS resource ID, SS/PBCH block ID) used for prior data transmission) rather than operations 501 to 505.

Figure 6:
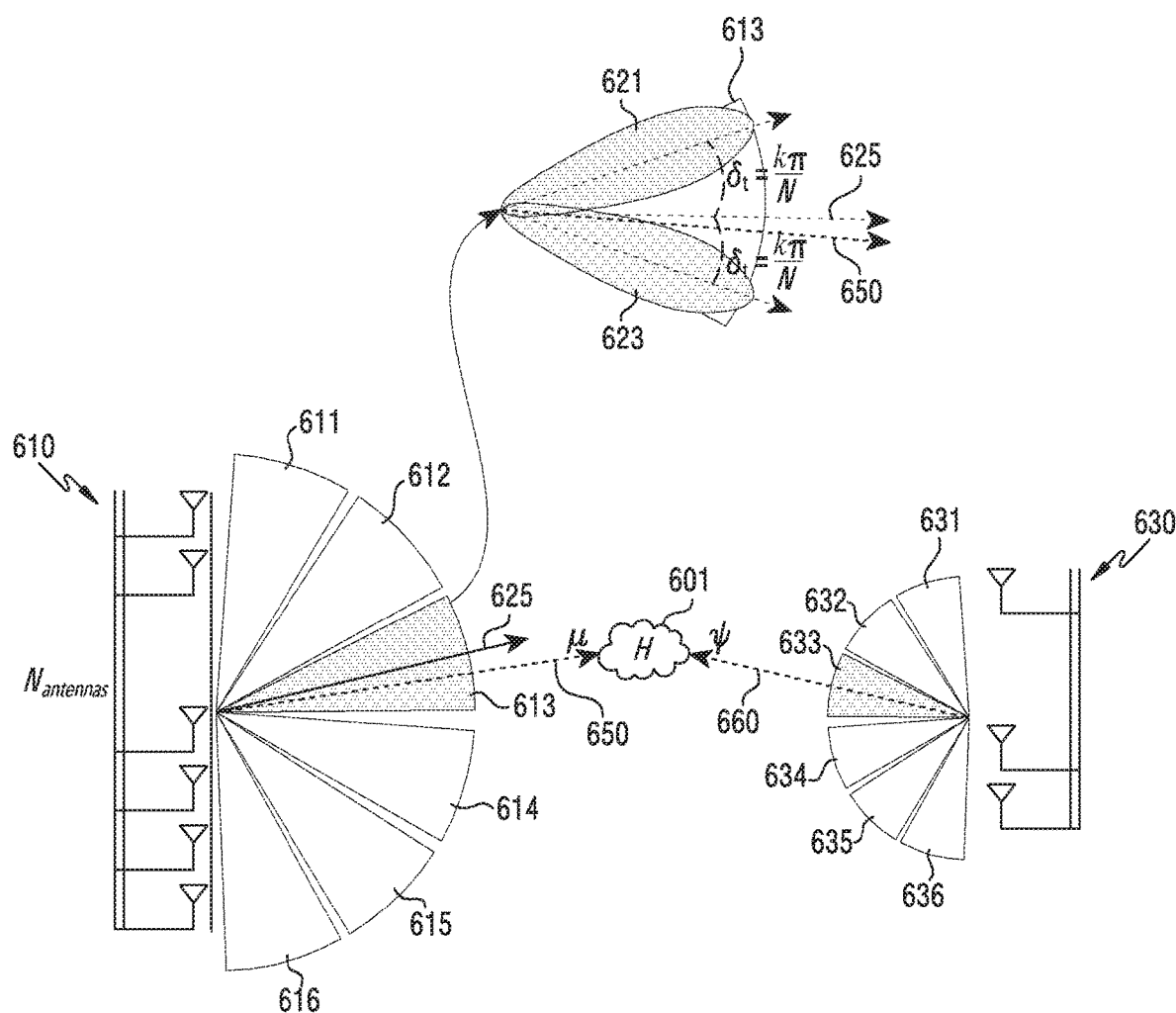
FIG. 6 illustrates an example of direction estimation according to an embodiment of the disclosure.

FIG. 6 illustrates an example of direction estimation according to an embodiment of the disclosure. FIG. 6 illustrates, as a direction estimation, the communication direction estimating procedure illustrated in FIG. 5, which uses a beam set and an auxiliary beam pair. FIG. 6 illustrates the first apparatus estimating an AoD as a transmission apparatus and the second apparatus estimating an AoA as a reception apparatus.

Referring to FIG. 6, the first apparatus and the second apparatus may communicate with each other through a channel 601. The first apparatus may transmit a signal to the second apparatus through the channel 601. The second apparatus may receive a signal from the first apparatus through the channel 601.

The first apparatus may include a transmission antenna array 610. The transmission antenna array 610 may form transmission beams 611, 612, 613, 614, 615, and 616 of a beam set. The determination of the beam set will be explained in detail with reference to FIGS. 7 and 8 described later. The first apparatus may determine the transmission beam 613 among the beams of the transmission antenna array 610 as a reference beam. The transmission beam 613 may be identified during a beam training procedure with the second apparatus. For example, the transmission beam 613 may provide the highest channel quality among the transmission beams 611, 612, 613, 614, 615, and 616.

The first apparatus may determine an auxiliary beam pair (first beam 621 and second beam 623) from the transmission beam 613 which is a reference beam. The boresight direction of the transmission beam 613 may be determined as a reference direction 625. The first apparatus may determine a beam pair symmetrical about the reference direction 625, to be an auxiliary beam pair. For example, the first apparatus may determine, as a beam pair of an auxiliary beam pair, a first beam 621 and a second beam 623 located at the opposite ends of an angle formed by the transmission beam 613. The reason of the determination is that a communication direction is located in the coverage of the transmission beam 613, that is, an angle range provided by the beamwidth of the transmission beam 613.

The second apparatus may include a reception antenna array 630. The reception antenna array 630 may form reception beams 631, 632, 633, 634, 635, and 636 of a beam set. The second apparatus may determine the reception beam 633 among the beams of the reception antenna array 630 as a reference beam. For example, the reception beam 633 may be determined through a beam training procedure.

A beam formed by an antenna array may be expressed to be a vector. That is, all the transmission beams and the reception beams may be configured by array response vectors. Therefore, the first beam 621 and the second beam 623, that is, the beams of the auxiliary beam pair determined by the first apparatus may be expressed by Equation 1 below.

$$a_t(v - \delta_t) = \frac{1}{\sqrt{N}}[1, e^{j(v-\delta_t)}, \ldots, e^{j(N-1)(v-\delta_t)}]^T \quad \text{Equation 1}$$

$$a_t(v + \delta_t) = \frac{1}{\sqrt{N}}[1, e^{j(v+\delta_t)}, \ldots, e^{j(N-1)(v+\delta_t)}]^T$$

$a_t(v-\delta_t)$ indicates a first array response vector of the first beam 621 of the auxiliary beam pair, and $a_t(v+\delta_t)$ indicates a second array vector of the second beam 623 of the auxiliary beam pair. The directions of the two beams configuring the auxiliary beam pair may be expressed by $v-\delta_t$ and $v+\delta_t$, respectively. v indicates the reference direction 625, that is, the boresight direction of the reference beam 613. v may be indicated as the direction of the auxiliary beam pair. $\delta_t$ indicates the direction difference between each beam (first beam 621 or second beam 623) of the auxiliary beam pair and the reference direction 625. N indicates the number of antennas of a corresponding transmission node. Subscript t means the transmission node. Hereinafter, in all the equations, subscript t means a transmission node (e.g. first apparatus), and subscript r means a reception node (e.g. second apparatus).

According to various embodiments, the first apparatus may determine $\delta_t$ according to Equation 2. The first apparatus may determine $\delta_t$ satisfying a particular condition in order to increase the accuracy of direction estimation through an auxiliary beam pair and reduce the complexity described later. The particular condition may be called a monotonic characteristic condition, a monotonic property condition, a monotonic function condition, etc. The detailed description of the particular condition will be explained with reference to FIGS. 9 and 10 described later.

$$\delta_t = \frac{k\pi}{N}(k = 1, 2, 3, \ldots) \quad \text{Equation 2}$$

$\delta_t$ indicates the direction difference between each beam (first beam 621 or second beam 623) of the auxiliary beam pair and the reference direction 625, and is expressed in radians. N indicates the number of antennas of the transmission node. k may be a natural number. According to various embodiments, $2\delta_t$ may be a beam gap of the auxiliary beam pair.

The channel 601 as a wireless communication path between the first apparatus and the second apparatus may be a single path as a MIMO channel. The channel 601 that an actual communication signal goes through may be expressed as a MIMO single path by Equation 3 below.

$$H = \alpha a_r(\psi) a_t(\mu)^*$$ Equation 3

Wherein H indicates the channel 601, and α indicates a channel gain. μ indicates a transmission direction 650 of the communication direction, that is, a transmission angle, AoD, and ψ indicates a reception direction 660 of the communication direction, that is, a reception angle, AoA. If there is no noise, a signal transmitted by using the two beams of the auxiliary beam pair may be expressed by Equation 4 below.

$$y^\Delta = \alpha a_r^*(\psi) a_r(\psi) a_t^*(\mu) a_t(\nu - \delta_t)$$

$$y^\Sigma = \alpha a_r^*(\psi) a_r(\psi) a_t^*(\mu) a_t(\nu + \delta_t)$$ Equation 4

Wherein $y^\Delta$ indicates a first reference signal transmitted by using the first beam of the auxiliary beam pair and $y^\Sigma$ indicates a second reference signal transmitted by using the second beam of the auxiliary beam pair. $a_r(\psi)$ indicates a reception response vector according to direction ψ.

According to various embodiments, if a transmission angle (e.g. AoD (μ)) corresponding to the transmission direction 650 is estimated, the first apparatus may previously obtain information relating to a reception angle (e.g. AoA (ψ)) corresponding to the reception direction 660. In some embodiments, the first apparatus may obtain information relating to the reception angle from the second apparatus. For example, the second apparatus may feed information relating to the reception angle back to the first apparatus. In some other embodiments, the information relating to the reception angle may be previously determined. For example, a reception terminal may receive a signal through a beam (e.g. omni-directional beam) having a wide beamwidth, whereby information relating to the reception angle may be previously determined.

The power of a signal transmitted by using the beams (i.e. first beam 621 and second beam 623) of the auxiliary beam pair according to Equation 4 may be expressed by Equation 5 below.

$$x^\Delta = (y^\Delta)^* y^\Delta \approx |\alpha|^2 a_t^*(\nu - \delta_t) a_t(\mu) a_t^*(\mu) a_t(\nu - \delta_t)$$

$$x^\Sigma = (y^\Sigma)^* y^\Sigma \approx |\alpha|^2 a_t^*(\nu - \delta_t) a_t(\mu) a_t^*(\mu) a_t(\nu - \delta_t)$$ Equation 5

$x^\Delta$ indicates the reception power of the first reference signal transmitted by using the first beam of the auxiliary beam pair. $x^\Sigma$ indicates the reception power of the second reference signal transmitted by using the second beam of the auxiliary beam pair.

The reception power of each beam (first beam 621 and second beam 623) of the auxiliary beam pair may be expressed as shown in Equation 7 below by using $a_t(\mu)$ of Equation 5 with the expressions of vectors illustrated in Equation 1 and the Equation 6 below.

$$\left| \sum_{m=1}^{M} e^{j(m-1)x} \right|^2 = \frac{\sin^2\left(\frac{Mx}{2}\right)}{\sin^2\left(\frac{x}{2}\right)}$$ Equation 6

$$x^\Delta = |\alpha|^2 \frac{\sin^2\left(\frac{N(\mu - \nu + \delta_t)}{2}\right)}{\sin^2\left(\frac{\mu - \nu + \delta_t}{2}\right)}$$ Equation 7

$$x^\Sigma = |\alpha|^2 \frac{\sin^2\left(\frac{N(\mu - \nu - \delta_t)}{2}\right)}{\sin^2\left(\frac{\mu - \nu - \delta_t}{2}\right)}$$

According to various embodiments, if the beam gap satisfies Equation 2, Equation 7 may be expressed to be Equation 8 below.

$$x^\Delta = |\alpha|^2 \frac{\sin^2\left(\frac{N(\mu - \nu)}{2}\right)}{\sin^2\left(\frac{\mu - \nu + \delta_t}{2}\right)}$$ Equation 8

$$x^\Sigma = |\alpha|^2 \frac{\sin^2\left(\frac{N(\mu - \nu)}{2}\right)}{\sin^2\left(\frac{\mu - \nu - \delta_t}{2}\right)}$$

The first apparatus may obtain a ratio metric by using the reception power of the beams of the auxiliary beam pair. A ratio metric may be a metric for determining the difference between the reference direction 625 and the actually estimated transmission direction 650. The ratio metric may be expressed by Equation 9 below.

$$\zeta^{AoD} = \frac{x^\Delta - x^\Sigma}{x^\Delta + x^\Sigma} = -\frac{\sin(\mu - \nu)\sin\delta_t}{1 - \cos(\mu - \nu)\cos\delta_t}$$ Equation 9

$\zeta^{AoD}$ indicates a ratio metric.

Equation 9 may be expressed to be Equation 10 below by using Equation 8.

$$\mu =$$ Equation 10

$$\nu - \arcsin\left(\frac{\zeta^{AoD}\sin(\delta_t) - \zeta^{AoD}\sqrt{1 - (\zeta^{AoD})^2}\sin(\delta_t)\cos(\delta_t)}{\sin^2(\delta_t) + (\zeta^{AoD})^2\cos^2(\delta_t)}\right)$$

μ is an AoD, and indicates the transmission direction 650. ν indicates the reference beam direction, in other words, the reference direction 625. The first apparatus may estimate the transmission direction 650 of the communication path according to Equation 10.

In FIG. 6, a scheme of estimating an AoD, that is, the transmission direction 650 of the communication path through the auxiliary beam pair has been described, but the disclosure is not limited thereto. The second apparatus may estimate an AoA, that is, the reception direction 660 of the communication path through the auxiliary beam pair by a similar scheme. According to an embodiment, the second apparatus may obtain information (e.g. information relating to AoD (μ)) relating to an angle corresponding to the transmission direction 650 from the first apparatus. The second apparatus may estimate an AoA, which is a reception angle, on the basis of information relating to a transmission angle corresponding to the transmission direction 650 and the reception power of the auxiliary beam pair of the first apparatus. According to another embodiment, the second apparatus may identify a reference reception beam through reception beam sweeping and estimate an AoA, which is a reception angle, by using an auxiliary beam vector determined according to the direction of the reference reception beam.

FIG. 6 illustrates an angle estimation scheme using an auxiliary beam pair on the basis of a single beam pair. However, as described above, direction estimation according to the disclosure can be performed by using a plurality of auxiliary beam pairs.

Determination of Beam Set

According to various embodiments, a procedure of forming a beam set for identification of a reference beam as well as a procedure of determining an auxiliary beam pair, based on the reference beam, and estimating an angle by using the auxiliary beam pair may be also understood as an embodiment. That is, a two-stage angle estimation scheme of the disclosure may include embodiments relating to a standard for determining an optimal beam set, that is, which beam set is determined, in addition to newly forming an auxiliary beam pair from one of the beams of a beam set. Hereinafter, FIGS. 7 and 8 illustrate embodiments for determining a beam set.

Figure 7:
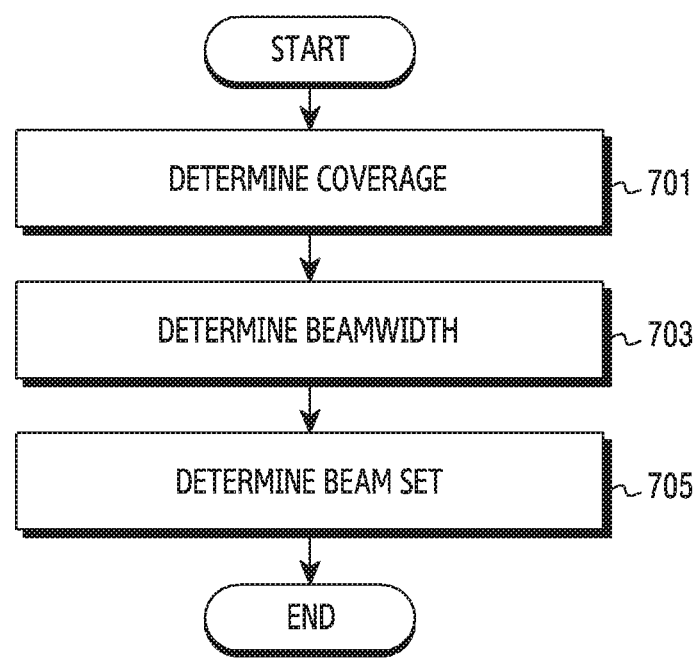
FIG. 7 illustrates a flowchart of a first apparatus for determining a beam set according to an embodiment of the disclosure.
Figure 8:
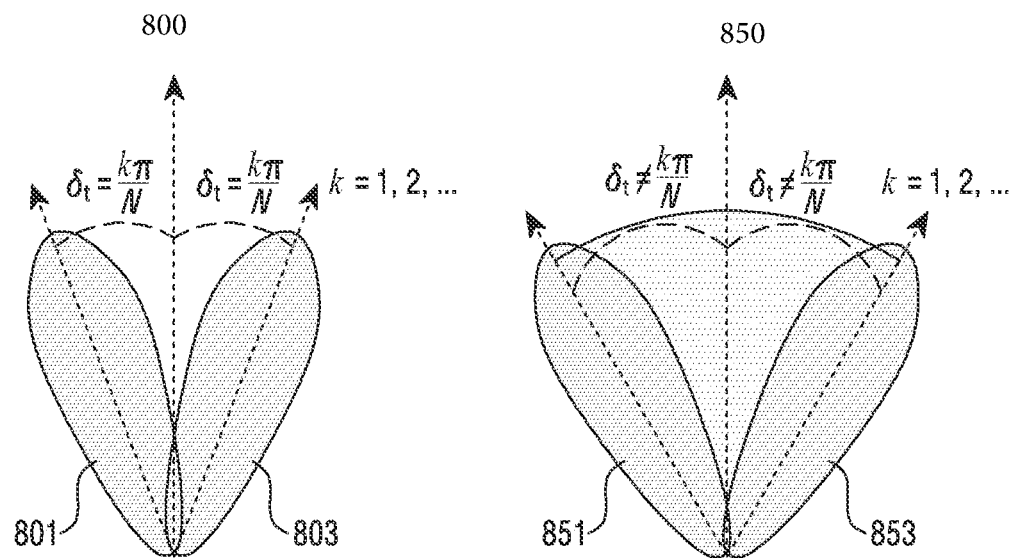
FIG. 8 illustrates an example of a beamwidth according to an embodiment of the disclosure.

FIG. 7 illustrates a flowchart of the first apparatus for determining a beam set according to an embodiment of the disclosure. FIG. 7 is a part of operation 501 of FIG. 5, and the flowchart of FIG. 7 may be understood through the first apparatus or an element of the first apparatus. The first apparatus may include the base station 110 or the terminal 120.

Referring to FIG. 7, in operation 701, the first apparatus may determine a coverage. The coverage may include a physical range of a communication direction in which the first apparatus is to perform transmission. For example, the first apparatus may determine a region corresponding to 180 degrees (i.e. 7C radians) as the coverage. For another example, the first apparatus may determine a region (e.g. the range from −60 degrees to +60 degrees) corresponding to 120 degrees as the coverage. For another example, the first apparatus may determine, as the coverage, a region corresponding to 360 degrees, that is, all directions.

In operation 703, the first apparatus may determine a beamwidth. The first apparatus may determine a beamwidth for facilitating the determination of an auxiliary beam pair. If the first apparatus determines, as an auxiliary beam pair, the beams of a beam set used for beam training, the direction of another beam is considered rather than the direction of a beam providing the greatest reception power, and thus an error compared to an actual direction may occur. Therefore, the first apparatus may determine a beamwidth for a beam set in order to easily determine an auxiliary beam pair from an optimal beam (i.e. a beam providing the highest communication quality).

According to various embodiments, the first apparatus may determine a beamwidth, based on a designated angle. The designated angle may be determined based on the number of antennas of an antenna array. In addition, the designated angle may be configured such that a ratio metric satisfies a monotonic characteristic. The ratio metric may indicate the relationship between direction and power. For example, the first apparatus may determine a beamwidth, based on an angle defined according to Equation 2. That is, the first apparatus may determine a beamwidth, based on a beam gap of an auxiliary beam pair.

According to various embodiments, the first apparatus may determine, as a beamwidth, a multiple of a beam gap of an auxiliary beam pair. For example, the first apparatus may determine the beamwidth of a beam set to be 2 m$\delta_t$ (m=1, 2, 3, . . . ). The gap of the auxiliary beam pair may be 2 $\delta_t \cdot \delta_t$ may be determined by Equation 2. The beam gap may be determined based on the number of antennas in an antenna array of the first apparatus. That is, the first apparatus may determine a beamwidth, based on the number of antennas in the antenna array.

In operation 705, the first apparatus may determine a beam set. The first apparatus may determine the beam set, based on the coverage and the beam gap. In a fixed coverage, the wider the beamwidth, the smaller the number of the beams in a beam set. Similarly, the narrow the beamwidth, the greater the number of the beams. The first apparatus may determine a beam set, that is, the set of beams covering a direction range corresponding to a determined coverage. For example, if the size of a direction range corresponding to a fixed coverage is 180 degrees (i.e. 7 radians) (e.g. from −90 to +90) and a beam gap is 30 degrees $$\left(\text{i.e. } \frac{\pi}{6} \text{ radians}\right),$$

a beam set may include six beams.

FIG. 7 illustrates determining a coverage before determining a beam gap, but a coverage may be configured after the determination of a beam gap or may be previously determined. In other words, embodiments are not limited to the order illustrated in FIG. 7.

FIG. 8 illustrates an example of a beamwidth according to an embodiment of the disclosure.

Referring to FIG. 8, the relationship between the beam gap of an auxiliary beam pair and the beamwidth of a beam set will be described by discriminating between two cases when the beam set is determined for beam training, the two cases including a case in which the beam set is determined to have a beamwidth for the auxiliary beam pair and a case in which the beam set is determined to have a beamwidth regardless of the auxiliary beam pair. A reference beam has been identified through a beam set for each of the cases.

Referring to FIG. 8, the first apparatus may determine a first beam 801 and a second beam 803, based on a reference beam 800. The first apparatus may determine, as an auxiliary beam pair, beams in opposite end directions of the reference beam 800. Since an actual communication direction is located between the directions of the beams of an auxiliary beam pair, the first apparatus may determine, as an auxiliary beam pair, beams corresponding to the opposite end directions of the reference beams 800. The beamwidth of the reference beam 800 may be 2$\delta_t \cdot \delta_t$ may be determined by Equation 2.

The first apparatus may determine a third beam 851 and a fourth beam 853, based on a reference beam 850. The first apparatus may determine, as an auxiliary beam pair, beams in opposite end directions of the reference beam 850. The beamwidth of the reference beam 850 may be 2$\delta_t'$. However, $\delta_t'$ may be determined differently from Equation 2. Since the beamwidth does not satisfy the condition of Equation 2, it is impossible to apply Equation 8, which shows a reception power. Direction estimation using an auxiliary beam pair as illustrated in FIG. 6 may not be easy to perform. Since the first apparatus performs direction estimation according to Equation 6, the accuracy may decrease if direction estimation is performed by using only given parameters (e.g. the reception power values of the beams of an auxiliary beam pair, and the direction of the reception beam).

If the first beam 801 and the second beam 803 are used as an auxiliary beam pair, the first apparatus may obtain higher accuracy of direction estimation, compared to using the third beam 851 and the fourth beam 853, as an auxiliary beam pair. 2$\delta_t$, which is the beamwidth of the reference beam 800, may be determined to be $$\frac{2k\pi}{N},$$

based on Equation 2. The disclosure provides Equation 8, which is simplified from Equation 7, and thus the first apparatus may estimate a communication direction from given parameters (e.g. the reception power values of the beams of an auxiliary beam pair, and the direction of the reception beam) The simplification to Equation 8 causes a monotonic function between reception power and direction estimation, and thus the first apparatus can obtain high accuracy of direction estimation. The performance of beam estimation using an auxiliary beam pair can be improved by forming a beam set having a proper size of beamwidth. Specific performances will be described with reference to FIGS. 13A and 13B.

Determination of Auxiliary Beam Pair

Figure 9:
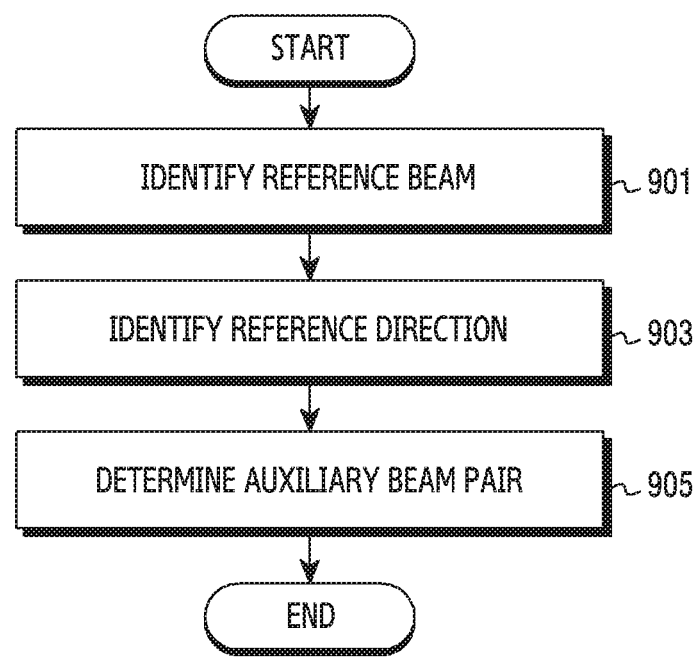
FIG. 9 illustrates a flowchart of a first apparatus for determining an auxiliary beam pair according to an embodiment of the disclosure.

FIG. 9 illustrates a flowchart of the first apparatus for determining an auxiliary beam pair according to an embodiment of the disclosure. FIG. 9 is a part of operation 507 of FIG. 5, and the flowchart of FIG. 9 may be understood through the first apparatus or an element of the first apparatus. The first apparatus may include the base station 110 or the terminal 120.

In operation 901, the first apparatus may identify a reference beam. The first apparatus may perform beam training by using a beam set of the first apparatus. The beam set may include a plurality of beams. In other words, the first apparatus may perform beam training by using the plurality of beams of the first apparatus. For example, the first apparatus may transmit a reference signal (or synchronization signal) by using each of the plurality of beams and obtain measurement results of channel qualities, thereby identifying a beam providing the highest channel quality among the plurality of beams. The first apparatus may determine the identified beam as a reference beam. According to various embodiments, the first apparatus may identify a reference beam providing the highest channel quality among the beams in a beam set for beam training.

In operation 903, the first apparatus may identify a reference direction. The first apparatus may identify a reference direction, based on the reference beam. The first apparatus may identify, as a reference direction, the center direction (e.g. boresight direction) of the reference beam. The boresight direction may mean a direction providing the maximum radiation gain at the time of radiation from an antenna. According to various embodiments, the first apparatus may obtain information relating to the boresight directions of the beams of the beam set. The information relating to the directions may be configured by the expression of array response vectors used in an antenna array at the time of beam formation.

In operation 905, the first apparatus may determine an auxiliary beam pair. The first apparatus may determine two beams symmetrical about the reference direction, to be an auxiliary beam pair. If the auxiliary beam pair includes a first beam and a second beam, the direction of the first beam and the direction of the second beam may have an axisymmetric relationship with respect to the reference direction. The auxiliary beam pair is designed for accurate direction estimation, and thus the beamwidth of each of the two beams of the auxiliary beam pair may be smaller than the beamwidth of each beam of the beam set according to various embodiments.

The first apparatus may determine that a communication direction for communication with the second apparatus is located within a range (hereinafter, angle range) corresponding to the beamwidth of the reference beam. According to various embodiments, the first apparatus may determine an auxiliary beam pair including beams corresponding to the opposite ends of an angle range in order to identify the communication direction by using the auxiliary beam pair.

According to various embodiments, if the beamwidth of the reference beam satisfies a multiple of $$2\delta_t \left( \delta_t = \frac{k\pi}{N} \right)$$

(i.e. the beamwidth is $2 \, m\delta_t$ ($m=1, 2, 3, \ldots$)), the angle (hereinafter, beam gap) between the beams of the auxiliary beam pair may be $$2m\delta_t = \frac{2k'\pi}{N} \left( \text{i.e. } 2\delta_t' = 2m\delta_t = \frac{2k'\pi}{N} (k' = mk) \right).$$

In some embodiments, the first apparatus may determine the beamwidth of the beam set to be $2 \, m\delta_t$ ($m=2, 3, \ldots$). That is, the beamwidth may be $m \neq 1$. The first apparatus may determine, as an auxiliary beam pair, two beams corresponding to the opposite ends of the reference beam on the basis of the direction of the reference beam. The beam gap of the auxiliary beam pair is $2 \, m\delta_t$, and the angle between the direction of each beam of the beam pair and the reference direction is $m\delta_t$. The angle between the beam direction of the auxiliary beam pair and the reference direction may satisfy equation $$\delta_t' = m\delta_t = \frac{k'\pi}{N} (k' = mk)).$$

k' is a natural number, which is m times of k, and thus et satisfies Equation 2.

In some embodiments, the first apparatus may determine, as an auxiliary beam pair, an additional beam pair rather than the two beams corresponding to the opposite ends of the reference beam. The beam gap of the additional auxiliary beam pair may satisfy Equation 2. The first apparatus can more accurately estimate a direction by forming an auxiliary beam pair in a narrower angle range. The first apparatus may estimate a direction through an auxiliary beam pair (hereinafter, primary beam pair) corresponding to the opposite ends of the reference beam, and additionally determine an auxiliary beam pair (hereinafter, secondary beam pair) within a narrower angle range. The secondary beam pair may have a beam gap satisfying Equation 2. For example, the beam gap of the primary beam pair may be $4\delta_t$, and the beam gap of the secondary beam pair may be $2\delta_t$.

Figure 10:
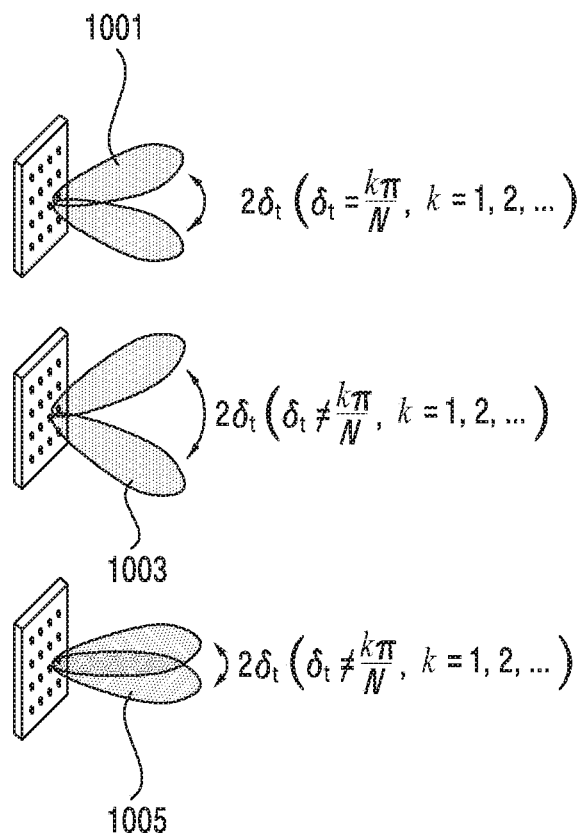
FIG. 10 illustrates an example of an auxiliary beam pair according to an embodiment of the disclosure.

FIG. 10 illustrates an example of an auxiliary beam pair according to an embodiment of the disclosure.

Referring to FIG. 10, the relationship between the gap of an auxiliary beam pair and the accuracy (or complexity) of direction estimation will be described.

Referring to FIG. 10, the first apparatus may form a first auxiliary beam pair 1001. The gap of the first auxiliary beam pair 1001 may be $2\delta_1$ (wherein, $$\delta_1 = \frac{k\pi}{N},$$

N is the number of antennas, and k is a natural number). As the gap of the first auxiliary beam pair 1001 satisfies $$\frac{2k\pi}{N}, \sin^2\left(\frac{N(\mu - \nu + \delta_t)}{2}\right)$$

of Equation 7 is simplified to be $$\sin^2\left(\frac{N(\mu - \nu)}{2}\right), \text{ and } \sin^2\left(\frac{N(\mu - \nu - \delta_t)}{2}\right)$$

of Equation 7 is simplified to be $$\sin^2\left(\frac{N(\mu-\nu)}{2}\right).$$

The periodicity of the trigonometrical functions is satisfied through the designated gap, and thus the simplification can be achieved. $\mu$ indicates a transmission direction of the communication direction, and $\nu$ indicates a reference direction.

Reception power may be simplified as shown in FIG. 8. As the expression for reception power is simplified, the monotonic property of a ratio metric may be satisfied. In other words, as the gap of the first auxiliary beam pair 1001 satisfies $$2\delta_1 = \frac{2k\pi}{N},$$

the radio metric of the first auxiliary beam pair 1001 may follow a monotonic function. Specifically, referring to Equation 9, in $$\zeta^{AoD} = -\frac{\sin(\mu-\nu)\sin\delta_t}{1-\cos(\mu-\nu)\cos\delta_t},$$

$\nu$ is determined as the direction of the reference beam, and $\delta_1$ is determined by $$\frac{k\pi}{N},$$

and thus $\zeta^{AoD}$ is a monotonic decreasing function of $\mu$. The first apparatus may obtain $\mu$ from $\zeta^{AoD}$ because ratio metric $\zeta^{AoD}$ is a monotonic function. The first apparatus may estimate $\mu$ through the Equation 10.

The first apparatus may form a second auxiliary beam pair 1003. The gap of the second auxiliary beam pair 1003 may be $2\delta_2$ (wherein, $$\delta_2 > \frac{k\pi}{N},$$

N is the number of antennas, and k is a natural number). The second auxiliary beam pair 1003 may have a beam gap greater than a beam gap satisfying the condition according to Equation 2. It is impossible for a relatively wide beam gap to provide the simplification of Equation 7 to Equation 8. Therefore, there is a difference between an actual operation and Equation 8 corresponding to reception power, and thus there occurs an error between an actual optimal communication direction and an estimated communication direction. Specifically, if the gap of the auxiliary beam pair does not satisfy a condition (Equation 2) according to various embodiments, the performance may degrade at a low SNR. Specific performances will be described with reference to FIGS. 13A to 14D.

The first apparatus may form a third auxiliary beam pair 1005. The gap of the third auxiliary beam pair 1005 may be $2\delta_3$ (wherein, $$\delta_3 < \frac{k\pi}{N},$$

N is the number of antennas, and k is a natural number). The third auxiliary beam pair 1005 may have a beam gap smaller than a beam gap satisfying the condition according to Equation 2. It is impossible for a relatively narrow beam gap to provide the simplification of Equation 7 to Equation 8. Therefore, there is a difference between an actual operation and Equation 8 corresponding to reception power, and thus there occurs an error between an actual optimal communication direction and an estimated communication direction. If an auxiliary beam pair is generated to have a relatively narrow beam gap, the monotonic property of a radio metric for direction estimation may not be maintained any longer. Therefore, if the first apparatus performs a direction estimation through the third auxiliary beam pair 1005, an estimation error convergence phenomenon (estimation error floor) can be caused at a high SNR. In other words, as the monotonic property is not maintained, even an increase in an SNR may not reduce an estimation error.

With reference to FIGS. 5 to 10, a two-stage direction estimation scheme of the disclosure has been described. For example, according to the disclosure, a rough angle range of a communication direction is found through an optimal beam by using the beams of a beam set, and an auxiliary beam pair is generated based on the optimal beam, so that the first apparatus can estimate an angle with high resolution. After beam training using the beams of a beam set, beam training using the beams of an auxiliary beam pair is performed additionally, so that the resolution can be increased with small overhead. In accordance with the above aspects and effects, in the disclosure, a condition for the beam gap of an auxiliary beam pair for improving the accuracy of direction estimation is previously defined, and the beamwidth of a beam set is determined in consideration of the beam gap according to the defined condition, so that the resolution of direction estimation can be increased, and a small estimation error can be achieved through a smaller number of beams.

According to various embodiments, the first apparatus may estimate a communication direction and then form a beam corresponding to the estimated communication direction. The first apparatus may communicate with the second apparatus through the formed beam. The first apparatus can provide the second apparatus with higher communication quality by forming a beam having more accurate direction. This is because as the direction of the beam coincides with an actual communication direction, a path loss within a determined power range is minimized.

Various embodiments can be also applied to terminal-to-terminal communication (e.g. V2X communication) as well as base station-to-terminal communication. Hereinafter, with reference to FIGS. 11 to 12C, a two-stage angle estimation scheme of the disclosure will be described with an example of vehicle-to-vehicle (V2V) communication.

Figure 11:
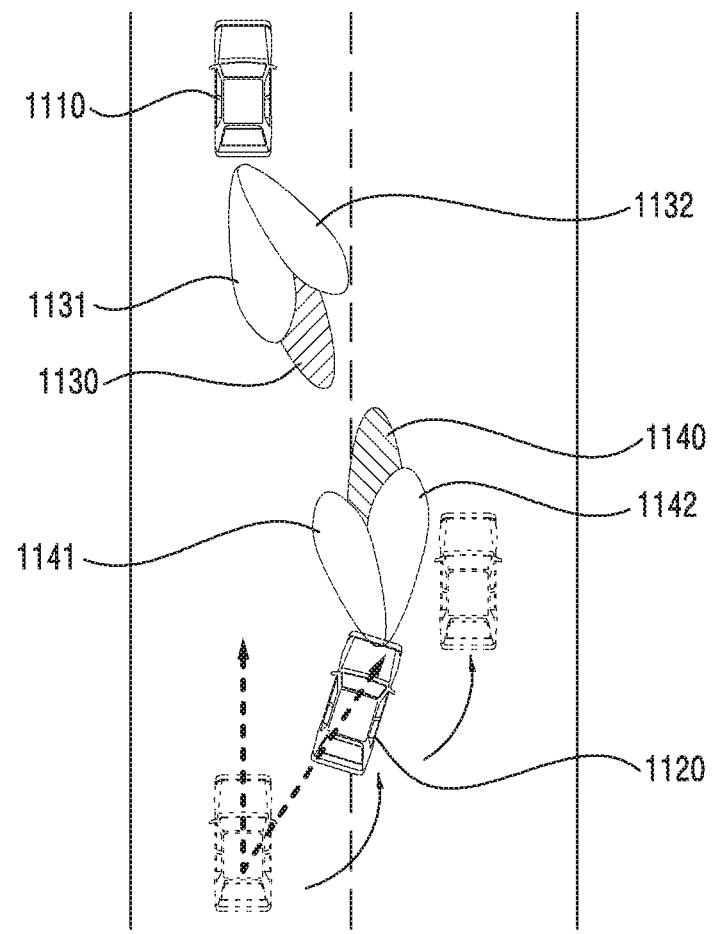
FIG. 11 illustrates an example of direction estimation in vehicle-to-vehicle communication according to an embodiment of the disclosure.

FIG. 11 illustrates an example of direction estimation in vehicle-to-vehicle communication according to an embodiment of the disclosure.

Referring to FIG. 11, a first vehicle 1110 may perform beamforming communication with a second vehicle 1120. If vehicles (e.g. first vehicle 1110 and second vehicle 1120) are traveling on a road, each of the vehicles moves in real time. In order to keep the beamforming communication between the vehicles, each of the vehicles may be required to find a proper beam, based on information (hereinafter, side information) relating to the traveling of each vehicle. Therefore, each of the vehicles is required to obtain side information. The second vehicle 1120 transmitting a signal to the first vehicle 1110 will be described. Embodiments will be described mainly for the operation of the second vehicle 1120, but the corresponding features may be also applied to the first vehicle 1110 in the same way.

The second vehicle 1120 may obtain side information. The side information may include at least one of vehicle velocity, steering wheel information, blinker information, inertial sensor information, etc. In some embodiments, the second vehicle 1120 may obtain side information of the first vehicle 1110. The second vehicle 1120 may obtain side information from the first vehicle 1110. In some other embodiments, the second vehicle 1120 may obtain side information of the second vehicle 1120. The second vehicle 1120 may obtain the side information through an internal sensor, etc. of the second vehicle 1120.

The second vehicle 1120 may determine a range of the communication direction of the second vehicle 1120 on the basis of the side information. For example, when the second vehicle 1120 transmits a signal to the first vehicle 1110, the second vehicle 1120 may determine a range of an AoD of the second vehicle 1120. Similarly, the first vehicle 1110 may determine a range of the communication direction of the first vehicle 1110 on the basis of the side information. For example, when the first vehicle 1110 receives a signal from the second vehicle 1120, the first vehicle 1110 may determine a range of an AoA of the first vehicle 1110.

The second vehicle 1120 may determine a coverage by determining a range of the communication direction. The coverage may correspond to the coverage in operation 701 of FIG. 7. The second vehicle 1120 may determine, as a beam set, beams satisfying a designated beamwidth $$\left(\text{e.g. } 2m\delta_t = \frac{2k'\pi}{N}\right)$$

among beams corresponding to directions located in the coverage.

The second vehicle 1120 previously determines a range of the communication direction (transmission direction) by using side information, so that the number of candidate beams of a beam set can be reduced. Rough locations of the vehicles are identified through side information, so that the coverages can be reduced. The reduction of the coverages can reduce the number of the beams of a beam set and the overhead of the beams at the time of beam training. In other words, the second vehicle 1120 can more efficiently determine a beam set through side information. In the same way, the first vehicle 1110 also previously determines a range of the communication direction (reception direction) by using side information, so that the number of candidate beams of a beam set can be reduced.

The second vehicle 1120 may perform beam training by using a beam set according to a reduced coverage. The second vehicle 1120 may identify a beam 1130 as a reference beam. The second vehicle 1120 may determine, as an auxiliary beam pair, a beam 1131 and a beam 1132 which are symmetrical about the direction of the beam 1130. The second vehicle 1120 may estimate a communication direction (e.g. AoD) for the first vehicle 1110 through the auxiliary beam pair. The beamwidth of the beam 1130 may be greater than those of the beams 1131 and 1132. Similarly, the first vehicle 1110 may perform beam training by using a beam set according to a reduced coverage. The first vehicle 1110 may determine, as an auxiliary beam pair, a beam 1141 and a beam 1142 which are symmetrical about the direction of a beam 1140. The first vehicle 1110 may estimate a communication direction (e.g. AoA) for the second vehicle 1120 through the auxiliary beam pair.

Figure 12A:
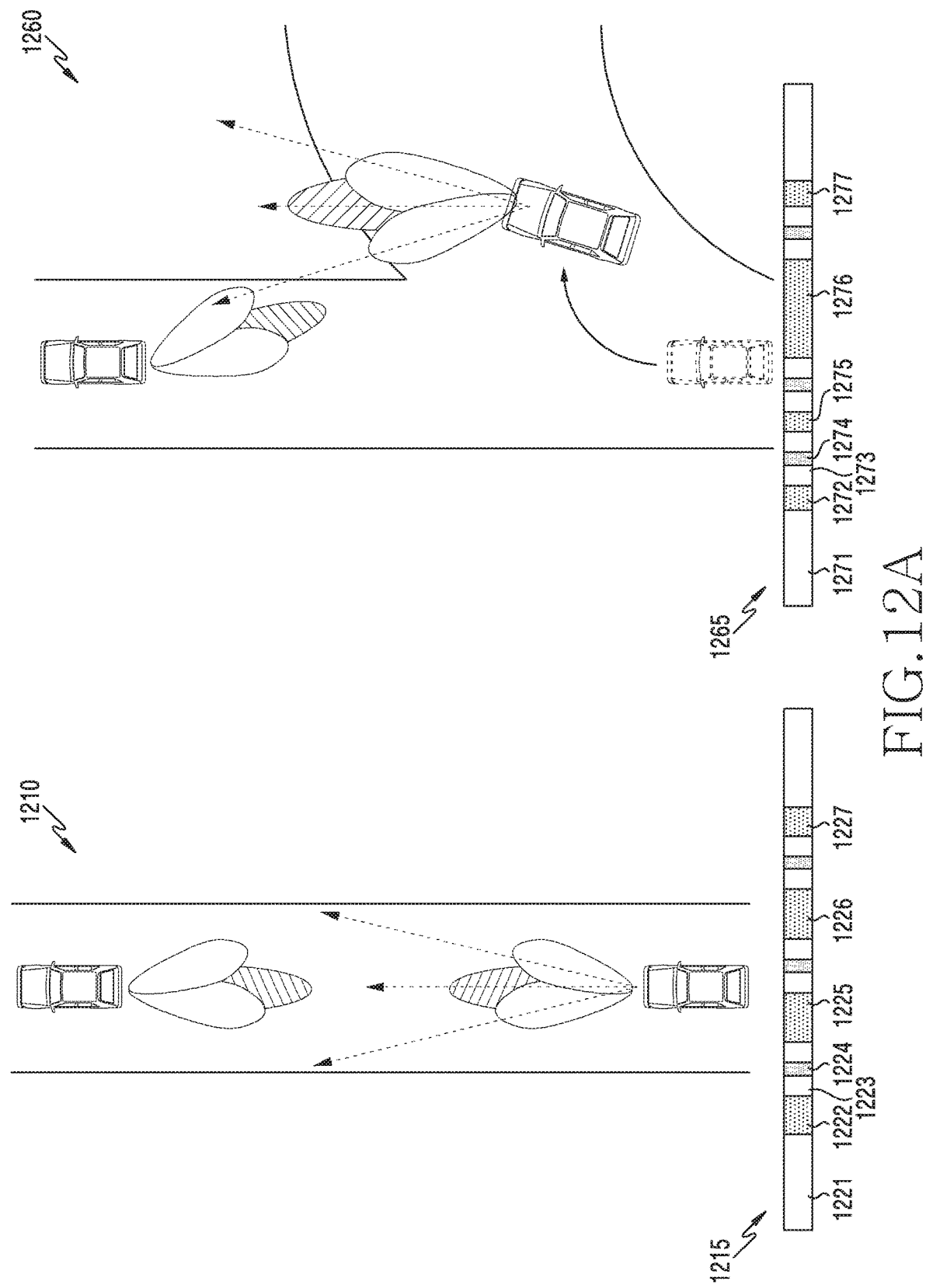
FIG. 12A illustrates an example of direction tracking in vehicle-to-vehicle communication according to an embodiment of the disclosure.

FIG. 12A illustrates an example of direction tracking in vehicle-to-vehicle communication according to an embodiment of the disclosure. An operation of determining a communication direction within the beamwidth of a determined reference beam may be called direction tracking.

Referring to FIG. 12A, a time domain behavior of a vehicle for direction tracking will be described. Direction tracking as described above includes direction estimation according to a two-stage angle estimation scheme according to various embodiments described with reference to FIGS. 5 to 10. A vehicle may determine a communication direction with the coverage of a reference beam by using beams of an auxiliary beam pair relating to the reference beam.

Referring to FIG. 12A, the second vehicle 1120 may perform periodic direction estimation 1210. The second vehicle 1120 may periodically perform direction estimation with the first vehicle 1110.

Referring to a periodic time flow 1215, the second vehicle 1120 may perform channel estimation during a period 1221. Through the channel estimation, the second vehicle 1120 may identify a reference beam and determine a reference direction. During a period 1222, the second vehicle 1120 may transmit data to the first vehicle 1110 through a data channel (e.g. dedicated data channel (DDC)). The period 1222 may be called a data period. The second vehicle 1120 may perform a transition during a period 1223. The transition means that a communication channel transitions from the data channel to a tracking channel (e.g. dedicated tracking channel (DTC)). The period 1223 may be called a transition period (TP). The second vehicle 1120 may determine a communication direction, that is, a direction for communication with the first vehicle 1110 through the tracking channel during a period 1224. The second vehicle 1120 may determine a communication direction through direction tracking within the coverage of a reference direction. Through a determination of an auxiliary beam pair according to the disclosure, the second vehicle 1120 may determine a communication direction for the first vehicle 1110. The period 1224 may be called a tracking period.

After the tracking period, the second vehicle 1120 may change the communication channel from the tracking channel to a data channel during a transition period. During a period 1225, the second vehicle 1120 may transmit data to the first vehicle 1110 through the data channel again. The second vehicle 1120 changes the communication channel to a tracking channel through a transition period, then determines a communication direction with the first vehicle 1110, and re-changes the communication channel to a data channel through a transition period again. During a period 1226, the second vehicle 1120 may transmit data to the first vehicle 1110 through the data channel again. Through the same periods (transition period→tracking period→transition period), the second vehicle 1120 may transmit data to the first vehicle 1110 through a data channel during a period 1227 again. Periodically, a transition period, a tracking period, a transition period, and a data period are repeated, whereby the second vehicle 1120 can periodically track a direction for the first vehicle 1110. In addition, the second vehicle 1120 may periodically transmit data to the first vehicle 1110. When a next channel estimation period has arrived, the second vehicle 1120 may identify a reference beam again and periodically perform direction tracking again.

The second vehicle 1120 may perform aperiodic direction estimation 1260. A triggering condition for performing the aperiodic direction estimation 1260 may be variously defined.

In some embodiments, the second vehicle 1120 may trigger the aperiodic direction estimation 1260 when the movement range of the second vehicle 1120 exceeds a threshold range. For example, the second vehicle 1120 may determine whether the movement range of the second vehicle 1120 exceeds a threshold range, the determination being performed based on the movement range of a steering wheel of the second vehicle and the velocity of the vehicle. If the moving velocity of the second vehicle 1120 is greater than or equal to a threshold velocity, and the movement angle of the steering wheel exceeds a threshold angle, the second vehicle 1120 determines that the movement range exceeds the threshold range. The second vehicle 1120 may start the aperiodic direction estimation 1260.

In some other embodiments, the second vehicle 1120 may trigger the aperiodic direction estimation 1260 of the second vehicle 1120 on the basis of GPS information and blinker information. For example, the second vehicle 1120 may recognize that the second vehicle has moved in a direction different from an existing traveling direction, the recognition being performed based on location information such as three-way or four-way intersection, and left blinker information. The second vehicle 1120 may start the aperiodic direction estimation 1260.

In some other embodiments, the second vehicle 1120 may trigger the aperiodic direction estimation 1260, based on the channel quality of a beam which is currently being used. For example, when the channel quality (e.g. RSRP) of a serving beam degrades rapidly, the second vehicle 1120 may declare a disconnection (e.g. BLF) of a link and determine that direction tracking is required. The second vehicle 1120 may start the aperiodic direction estimation 1260.

Referring to an aperiodic time flow 1265, the second vehicle 1120 may perform channel estimation during a period 1271. During a period 1272, the second vehicle 1120 may transmit data to the first vehicle 1110 through a data channel. The second vehicle 1120 may perform a transition of a communication channel from the data channel to a tracking channel during a period 1273. The second vehicle 1120 may determine a communication direction, that is, a direction for communication with the first vehicle 1110 through the tracking channel during a period 1274. The second vehicle 1120 may determine a communication direction for the first vehicle 1110 within the beamwidth of a reference beam. After the period 1274, the second vehicle 1120 may undergo a transition period and then transmit data to the first vehicle 1110 through a data channel again during a period 1275.

If aperiodic direction estimation is triggered in the procedure of periodically performing direction tracking and data transmission, the second vehicle 1120 may perform direction tracking and then transmit data to the first vehicle 1110 in random periods. After the second vehicle 1120 performs direction tracking, the second vehicle 1120 may transmit data to the first vehicle 1110 during a period 1276. After the second vehicle 1120 aperiodically performs direction tracking, the second vehicle 1120 may transmit data to the first vehicle 1110 during a relatively long period of time. After the second vehicle 1120 performs direction tracking, the second vehicle 1120 may transmit data to the first vehicle 1110 during a period 1277. After the second vehicle 1120 aperiodically performs direction tracking, the second vehicle 1120 may transmit data to the first vehicle 1110 during a relatively short period of time. The second vehicle 1120 can obtain a communication direction when needed, by manually triggering direction tracking according to a situation requiring the direction tracking, and can increase a communication efficiency by flexibly adjusting a data period as needed.

Figure 12B:
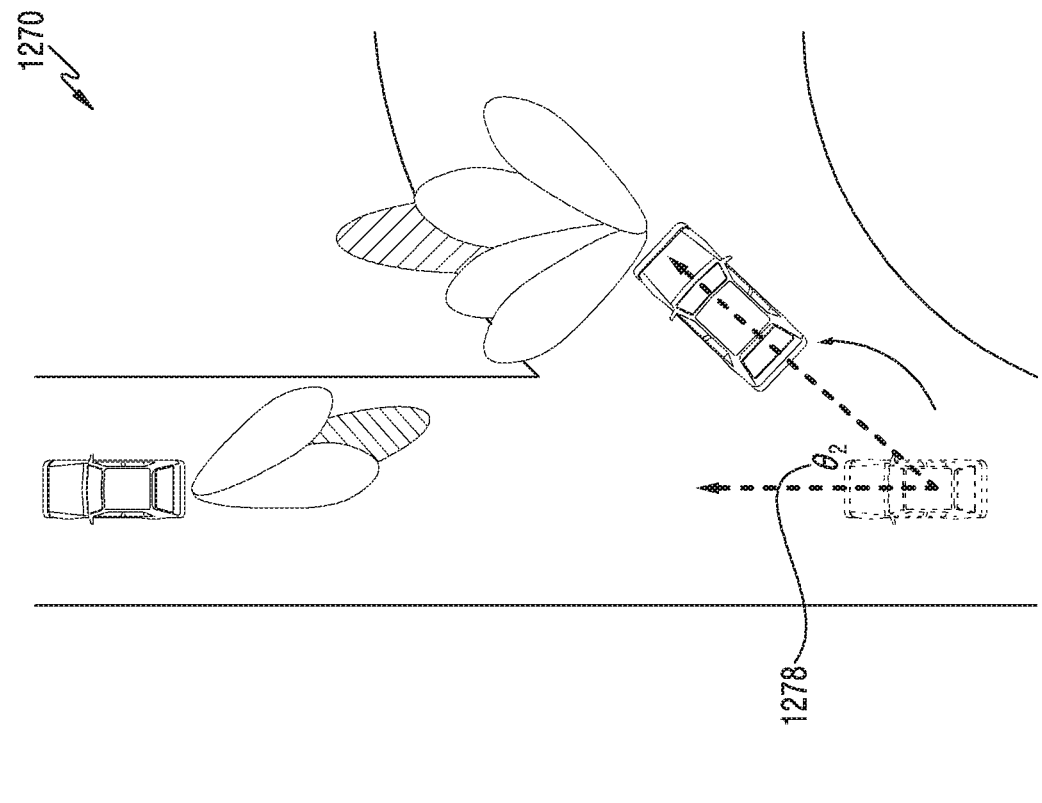
FIG. 12B illustrates an example of direction tracking by a change of a traveling direction in vehicle-to-vehicle communication according to an embodiment of the disclosure.
Figure 12B:
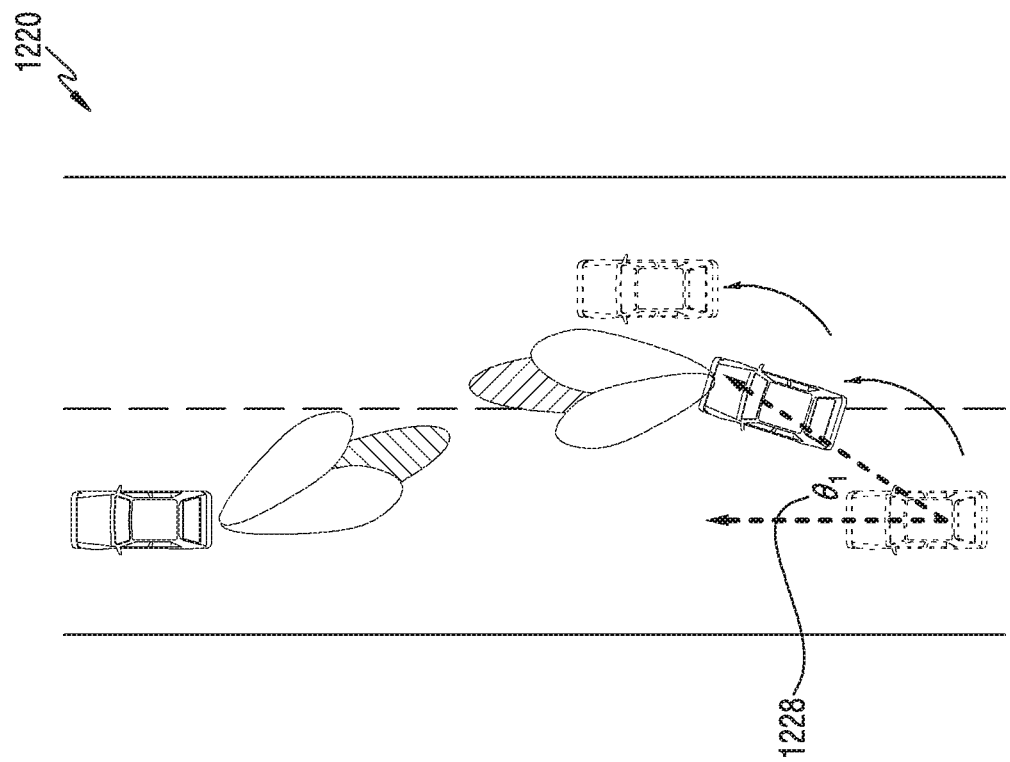

FIG. 12B illustrates an example of direction tracking by a change of a traveling direction in vehicle-to-vehicle communication according to an embodiment of the disclosure. Direction tracking as described above includes a determination of an auxiliary beam pair, which is described with reference to FIGS. 5 to 10. FIG. 12B illustrates an example of the determination of the number of auxiliary beam pairs according to a change of the traveling direction of a vehicle.

Referring to FIG. 12B, in a first example 1220, the second vehicle 1120 may change the traveling direction by a first angle 1228 ($\theta_1$). The second vehicle 1120 may determine a direction range corresponding to the first angle 1228. The second vehicle 1120 may determine the number of auxiliary beam pairs according to the determined direction range. For example, when the first angle 1228 does not exceed a threshold range, the second vehicle 1120 may determine an auxiliary beam pair. The second vehicle 1120 may determine, as an auxiliary beam pair, beams corresponding to the opposite ends of the beamwidth of a reference beam. For example, both the beamwidth of each beam of a beam set of the second vehicle 1120 and the gap of the auxiliary beam pair may be $$2\delta_t = \frac{2k\pi}{N}.$$

In a second example 1270, the second vehicle 1120 may change the traveling direction by a second angle 1278 ($\theta_2$). The second vehicle 1120 may determine a direction range corresponding to the second angle 1278. The second vehicle 1120 may determine the number of auxiliary beam pairs according to the determined direction range. For example, when the second angle 1278 exceeds the threshold range, the second vehicle 1120 may determine two or more auxiliary beam pairs. In other words, the second vehicle 1120 may determine auxiliary beam pairs formed by pairing not only beams corresponding to the opposite ends of the beamwidth of a reference beam, but also other beams that are symmetrical about the reference direction of the reference beam and are spaced a predetermined angle apart $$\left(\text{e.g. } \delta_t = \frac{k\pi}{N}\right)$$

from each other. For example, the beamwidth of each beam of a beam set of the second vehicle 1120 may be $$4\delta_t = \frac{4k\pi}{N}.$$

For example, the beam gap of a first auxiliary beam pair may be $$4\delta_t = \frac{4k\pi}{N},$$

and the beam gap of a second auxiliary beam pair may be $$2\delta_t = \frac{2k\pi}{N}.$$

Both the beam gaps of the auxiliary beam pairs satisfy the condition of Equation 2.

FIG. 12B illustrates embodiments of two cases according to whether a changed angle of the traveling direction exceeds a threshold range, but the disclosure is not limited thereto. According to various embodiments, K (K is a natural number equal to or greater than 3) number of levels according to the changed angles at the time of travelling changes may be defined, and the number of auxiliary beam pairs corresponding to each level may be defined. The second vehicle 1120 may estimate a direction for the first vehicle 1110 by operating three or more auxiliary beam pairs.

Figure 12C:
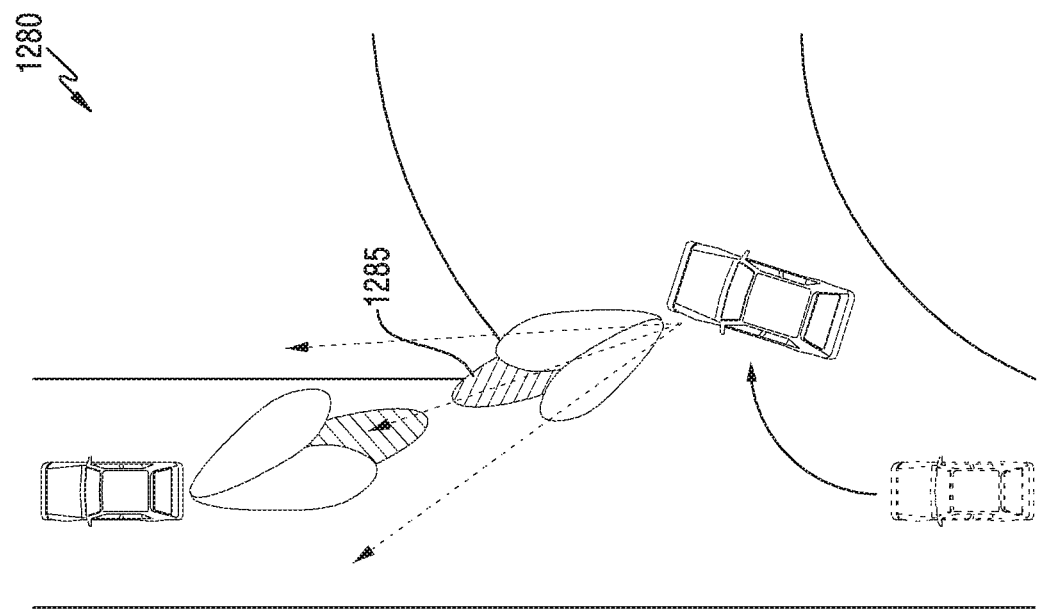
FIG. 12C illustrates an example of direction estimation by a change of a reference direction in vehicle-to-vehicle communication according to an embodiment of the disclosure.
Figure 12C:
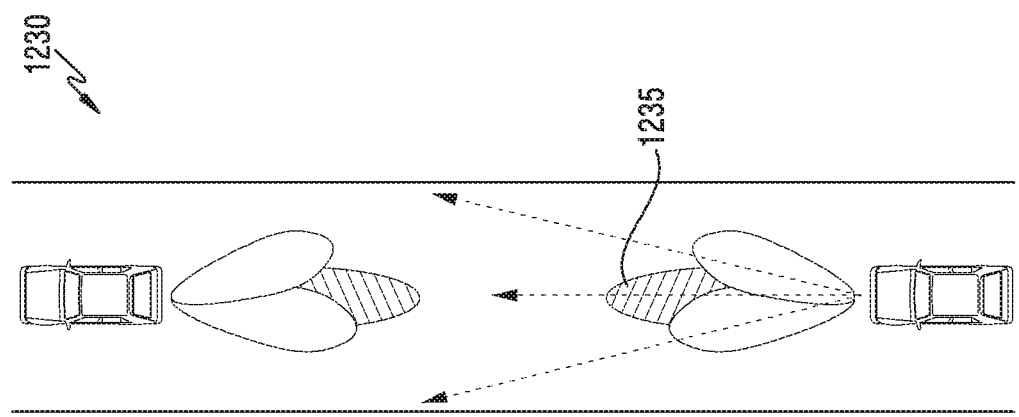

FIG. 12C illustrates an example of direction estimation by a change of a reference direction in vehicle-to-vehicle communication according to an embodiment of the disclosure. Direction estimation as described above includes direction estimation according to a two-stage angle estimation scheme according to various embodiments described with reference to FIGS. 5 to 10. With reference to FIG. 12C, a direction estimation procedure through tracking of a reference beam will be described.

Referring to FIG. 12C, the second vehicle 1120 may track a reference beam. According to a tracking result, the second vehicle 1120 may determine whether to maintain a first reference beam 1235 as a reference beam for determining an auxiliary beam pair. In a first example 1230, the second vehicle 1120 may maintain a reference beam to be the first reference beam 1235. On the contrary, in a second example 1280, the second vehicle 1120 may change a reference beam into a second reference beam 1285.

According to various embodiments, the second vehicle 1120 may periodically determine whether to maintain the first reference beam 1235 as a reference beam for determining an auxiliary beam pair. In some embodiments, the second vehicle 1120 may periodically determine whether the traveling direction is changed without exceeding a threshold range. The threshold range may be configured for requiring a change in the direction of the reference beam. According to an embodiment, the threshold range may be determined based on the beamwidth of each beam of a beam set. For example, the threshold range may be configured to have an angle greater than the beamwidth. The second vehicle 1120 may identify a first reference beam 1235 among the beams in a beam set. The second vehicle 1120 may determine a communication direction for the first vehicle 1110 by using an auxiliary beam pair corresponding to the first reference beam 1235. The second vehicle 1120 may communicate with the first vehicle 1110 through the determined communication direction.

In some other embodiments, the second vehicle 1120 may periodically measure a channel quality relating to the first reference beam 1235. The second vehicle 1120 may determine whether to maintain the first reference beam 1235 as a reference beam for determining an auxiliary beam pair, according to the changed degree of the channel quality. In some other embodiments, the second vehicle 1120 may periodically receive channel information from the first vehicle 1110. The second vehicle 1120 may determine whether to maintain the first reference beam 1235 as a reference beam for determining an auxiliary beam pair, according to a parameter (e.g. channel quality indicator (CQI) and CSI-RS resource indicator (CRI)) included in the channel information (e.g. CSI).

In some other embodiments, the second vehicle 1120 may periodically obtain side information of the second vehicle 1120. The second vehicle 1120 may determine whether to maintain the first reference beam 1235 as a reference beam for determining an auxiliary beam pair, according to velocity information, rotation information (e.g. steering wheel rotation information), and sensor information (e.g. inertial sensor) included in the side information.

The second vehicle 1120 may aperiodically determine whether to maintain the first reference beam 1235 as a reference beam for determining an auxiliary beam pair. The second vehicle 1120 may detect a predefined triggering condition to determine a change of the reference beam. For example, when a signal requiring a beam change is received from the first vehicle 1110, the second vehicle 1120 may determine whether to maintain the reference beam. The second vehicle 1120 may determine whether to change the reference beam, through beam training.

If a change of the reference beam is determined, the second vehicle 1120 may identify a second reference beam 1285. The second vehicle 1120 may manually perform beam training. The second vehicle 1120 may transmit a signal by using each of the beams of a beam set, thereby performing beam training. According to an embodiment, the second vehicle 1120 may reduce the number of candidate beams of a beam set, on the basis of side information, as illustrated in FIG. 11. The second vehicle 1120 may identify a second reference beam 1285 as a new reference beam. The second vehicle 1120 may determine a communication direction for the first vehicle 1110 by using an auxiliary beam pair corresponding to the second reference beam 1285. The second vehicle 1120 may communicate with the first vehicle 1110 through the determined communication direction.

Figure 13A:
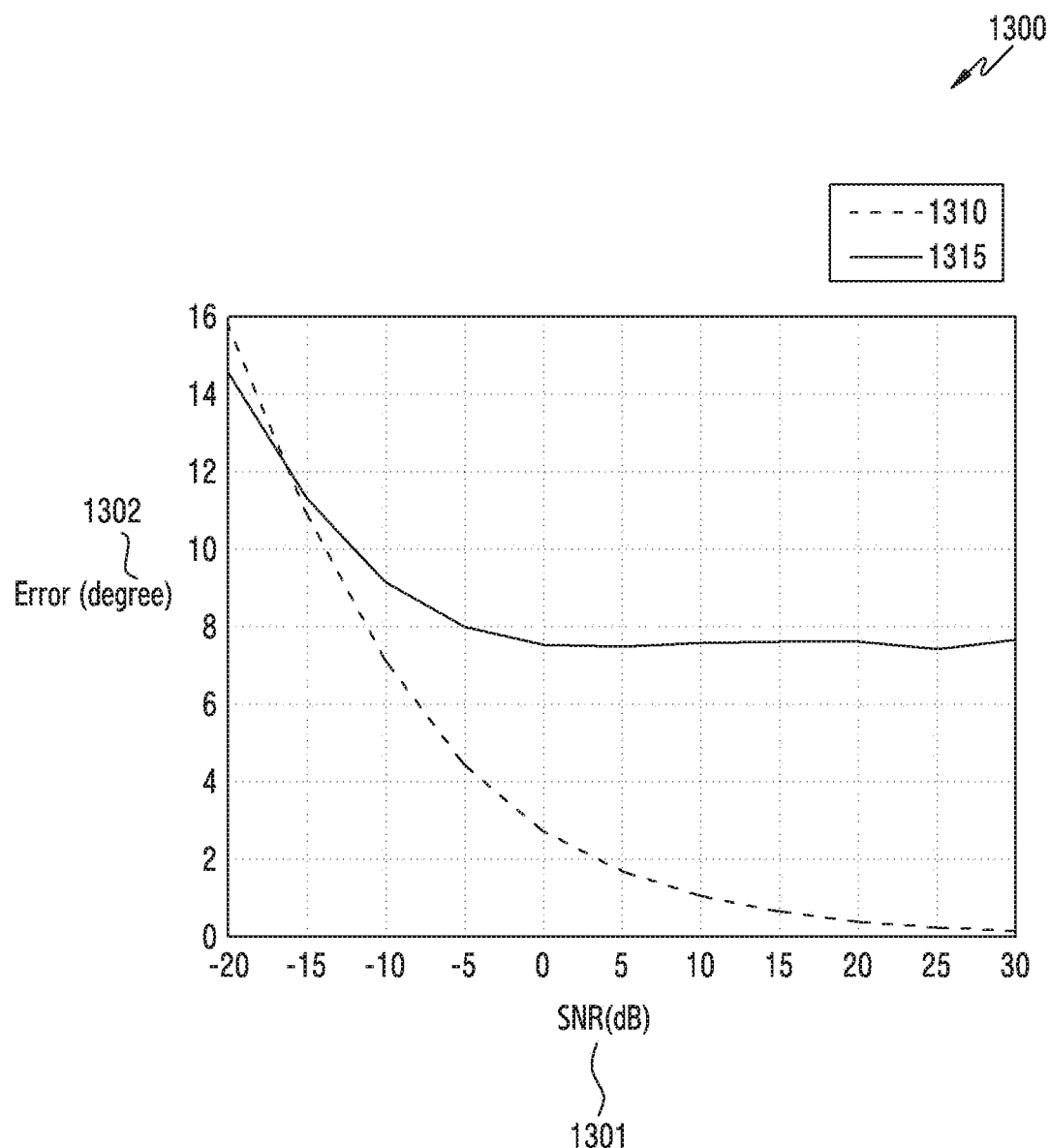
FIG. 13A illustrates a graph showing the performance of a beamwidth according to an embodiment of the disclosure.

FIG. 13A illustrates a graph showing the performance of a beamwidth according to an embodiment of the disclosure.

Figure 13B:
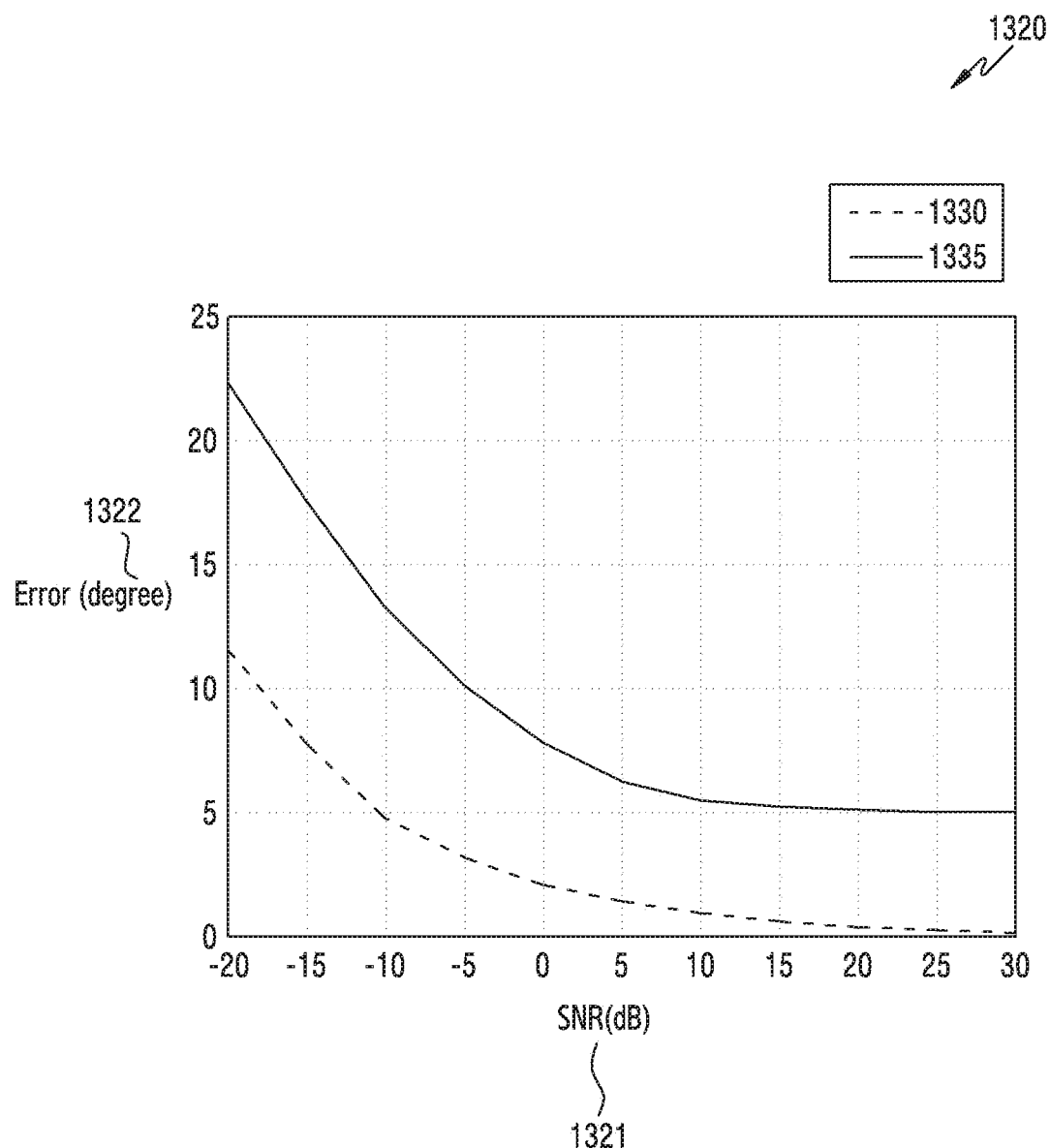
FIG. 13B illustrates a graph showing the performance of a beamwidth according to an embodiment of the disclosure.

FIG. 13B illustrates a graph showing the performance of a beamwidth according to an embodiment of the disclosure. A beamwidth may be an angle determined based on a monotonic characteristic condition according to various embodiments of the disclosure.

Referring to FIG. 13A, a graph 1300 shows the difference in performance between a beam set satisfying a monotonic characteristic condition and a beam set that does not satisfy the condition, in the case where each of the number of antennas of a transmission antenna array and the number of antennas of a reception antenna array is 8. A transverse axis 1301 shows an SNR (dB), and a longitudinal axis 1302 shows an average error (hereinafter, estimation error) (°) on angle estimation. An actual communication direction is assumed to have a random value within a range of [−60°, 60°]. A first line 1310 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1315 shows the performance of direction estimation using an auxiliary beam pair after a reference beam is identified by using a beam set having a beamwidth $$\left(2\delta_t \neq \frac{2k\pi}{N}\right)$$

that does not satisfy the monotonic characteristic condition.

As shown in a graph 1300, it may be noted that as the SNR increases, the difference in estimation error between the beam set satisfying the monotonic characteristic condition and the beam set that does not satisfy the condition gradually increases. Through an increase in the estimation error difference with respect to SNRs equal to or greater than a reference value, whether direction estimation using a beam set satisfying the monotonic characteristic condition of the disclosure has been performed may be identified.

Referring to FIG. 13B, a graph 1320 shows the difference in performance between a beam set satisfying a monotonic characteristic condition and a beam set that does not satisfy the condition, in the case where the number of antennas of a transmission antenna array is 16 and the number of antennas of a reception antenna array is 8. A transverse axis 1321 shows an SNR (dB), and a longitudinal axis 1322 shows an estimation error (°). An actual communication direction is assumed to have a random value within a range of [−60°, 60°]. A first line 1330 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1335 shows the performance of direction estimation using an auxiliary beam pair after a reference beam is identified by using a beam set having a beamwidth $$\left(2\delta_t \neq \frac{2k\pi}{N}\right)$$

that does not satisfy the monotonic characteristic condition.

As shown in a graph 1320, it may be noted that as the SNR increases, the estimation errors of the beam set satisfying the monotonic characteristic condition and the beam set that does not satisfy the condition all decreases, but the smaller estimation error is obtained through direction estimation using the beam set satisfying the monotonic characteristic condition. Through an estimation error changing according to whether the monotonic characteristic condition is satisfied, whether the disclosure has been performed may be identified.

Figure 14A:
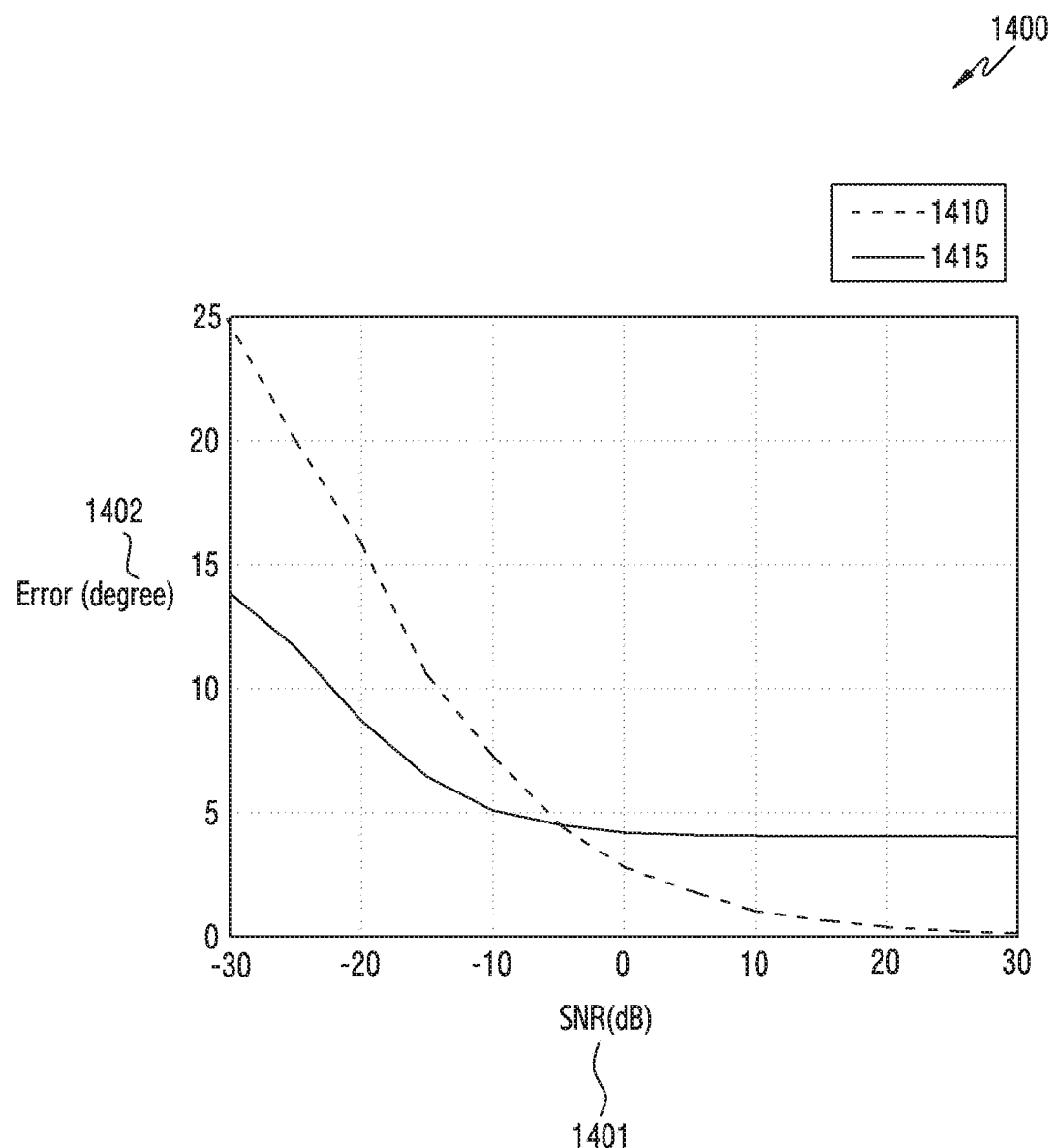
FIG. 14A illustrates a graph showing the performance of direction estimation by a two-stage angle estimation scheme according to an embodiment of the disclosure.

FIG. 14A illustrates a graph showing the performance of direction estimation by a two-stage angle estimation scheme according to an embodiment of the disclosure.

Figure 14B:
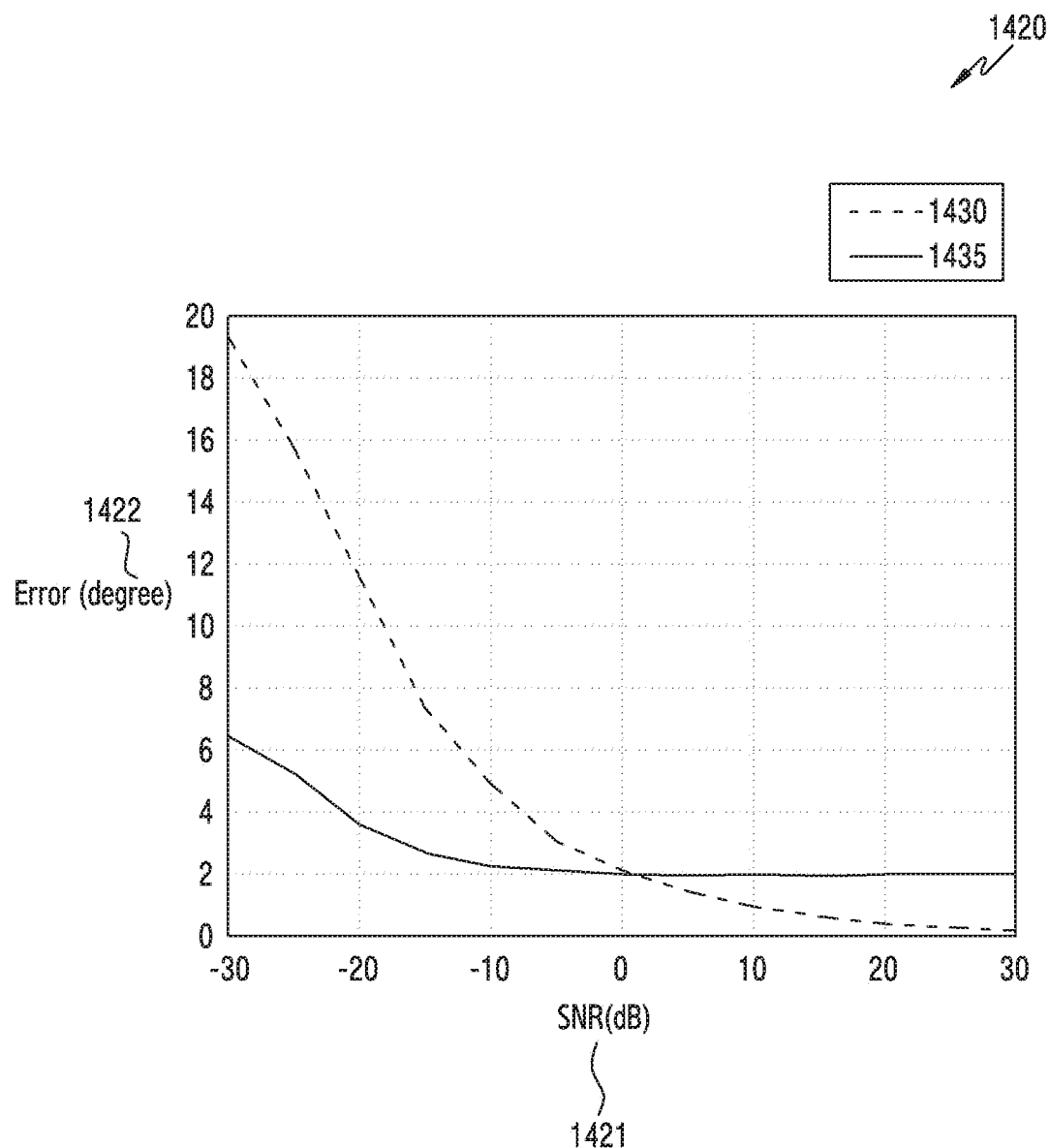
FIG. 14B illustrates a graph showing the performance of direction estimation by a two-stage angle estimation scheme according to an embodiment of the disclosure.

FIG. 14B illustrates a graph showing the performance of direction estimation by a two-stage angle estimation scheme according to an embodiment of the disclosure.

Figure 14C:
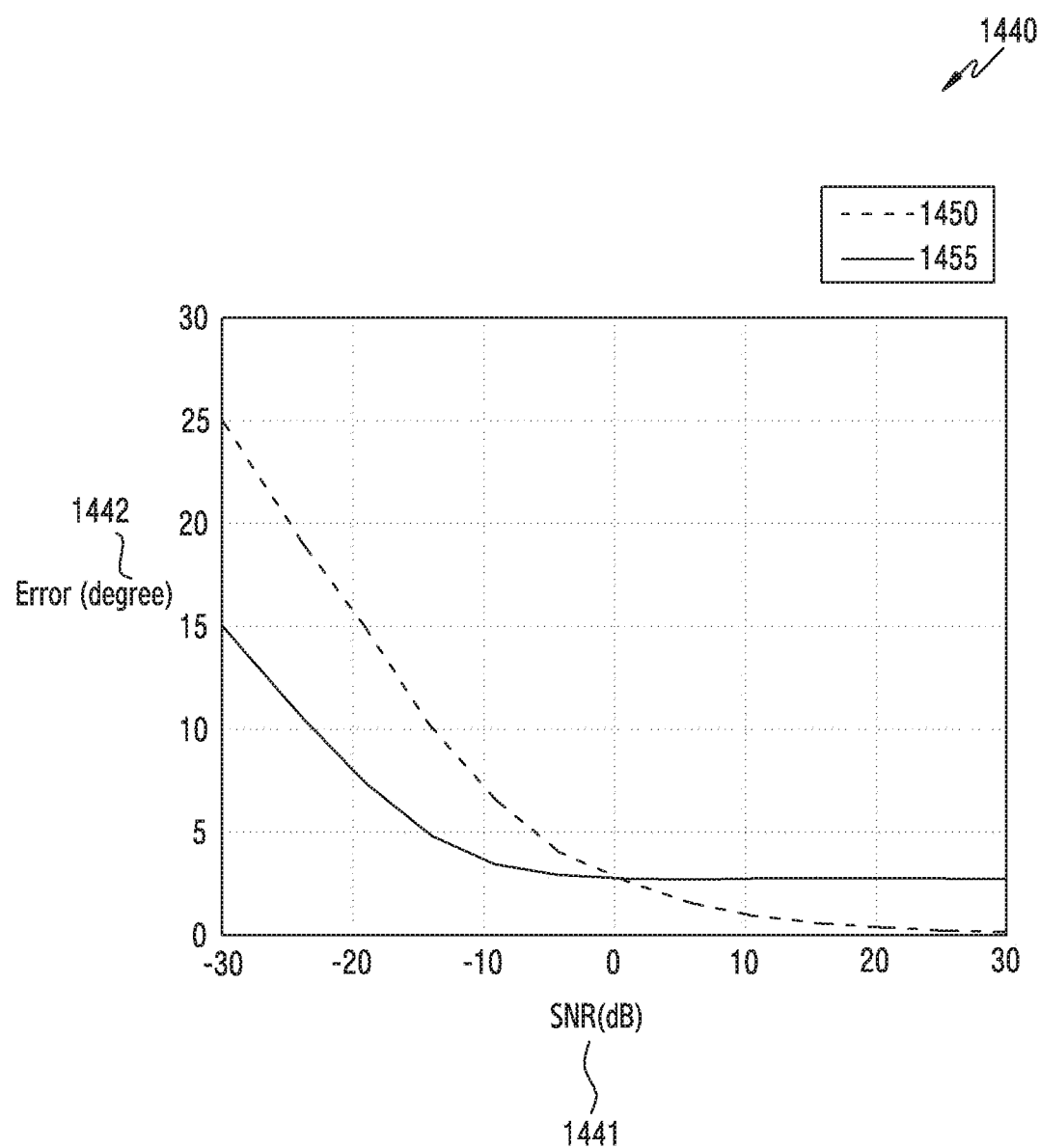
FIG. 14C illustrates a graph showing the performance of direction estimation by a two-stage angle estimation scheme according to an embodiment of the disclosure.

FIG. 14C illustrates a graph showing the performance of direction estimation by a two-stage angle estimation scheme according to an embodiment of the disclosure.

Figure 14D:
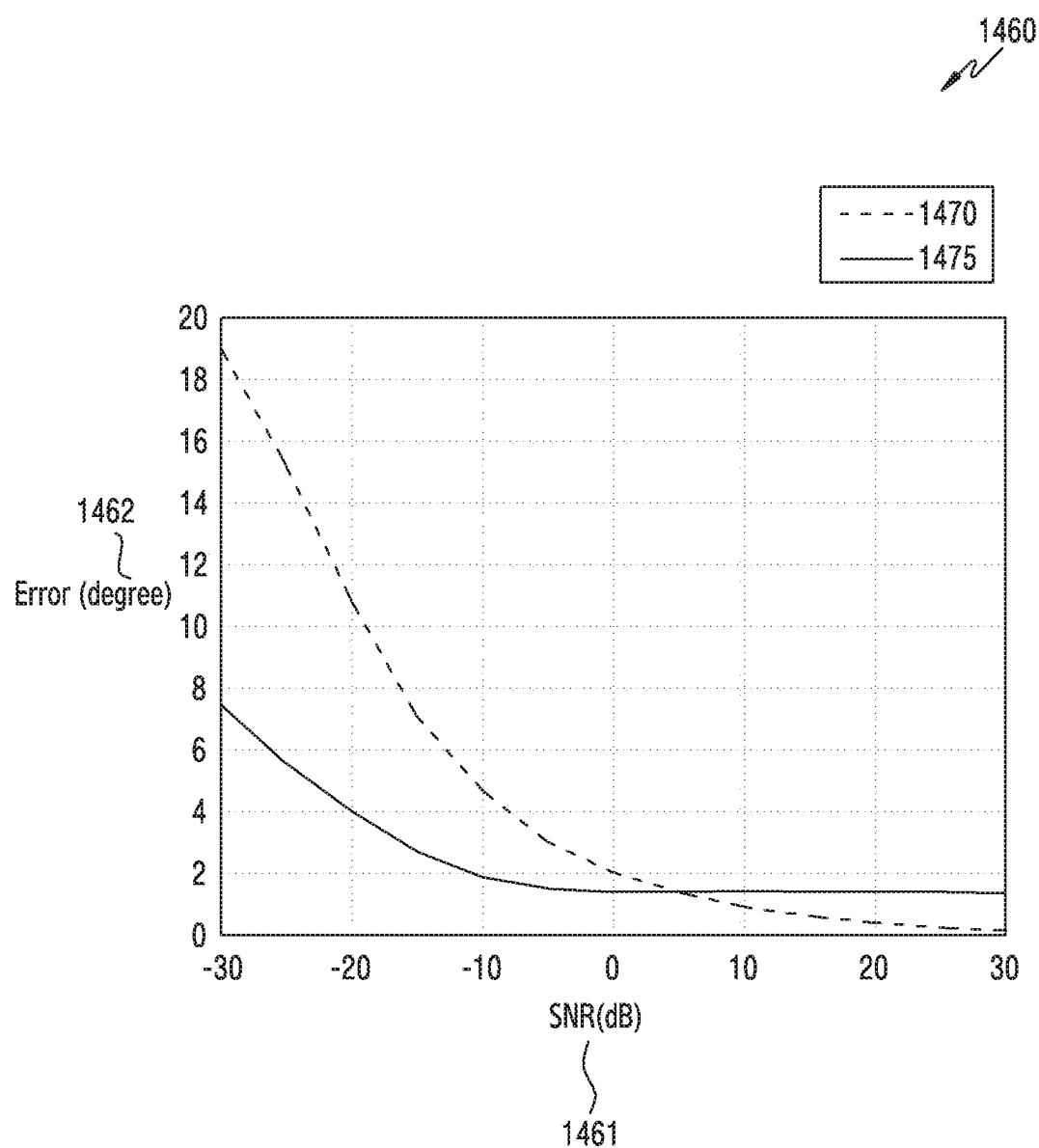
FIG. 14D illustrates a graph showing the performance of direction estimation by a two-stage angle estimation scheme according to an embodiment of the disclosure.

FIG. 14D illustrates a graph showing the performance of direction estimation by a two-stage angle estimation scheme according to an embodiment of the disclosure.

Referring to FIG. 14A, a graph 1400 shows the difference in performance between a direction estimation scheme using an auxiliary beam pair and a beam set satisfying a monotonic characteristic condition and a GoB scheme, in the case where each of the number of antennas of a transmission antenna array and the number of antennas of a reception antenna array is 8. A transverse axis 1401 shows an SNR (dB), and a longitudinal axis 1402 shows an estimation error (°). An actual communication direction is assumed to have a random value within a range of [−60°, 60°]. A first line 1410 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1415 shows the performance of a GoB scheme of identifying a particular beam by using a plurality of beams, and then determining, as a communication direction, the boresight direction of the particular beam.

The scheme according to the first line 1410, that is, a two-stage angle estimation scheme according to various embodiments uses a total of eight beams. The beam set may include a total of six beams. Two beams corresponding to the opposite ends of a reference beam among the six beams may be used as an auxiliary beam pair. Therefore, for the two-stage angle estimation scheme, signaling (e.g. transmission of a beamformed reference signal and feedback on the signal) for the total of eight beams is used. In the GoB scheme, that is, the scheme according to the second line 1415, beam training is performed through eight beams, and the second line 1415 shows the resultant performance.

As shown in the graph 1400, it may be noted that as the SNR increases, the performance of the two-stage angle estimation scheme increases compared to the GoB scheme. It may be noted that the two-stage angle estimation scheme can provide an estimation error smaller than that of the GoB scheme while using the same number of beams as that of the GoB scheme.

Referring to FIG. 14B, a graph 1420 shows the difference in performance between a direction estimation scheme using an auxiliary beam pair and a beam set satisfying a monotonic characteristic condition and a GoB scheme, in the case where the number of antennas of a transmission antenna array is 16, and the number of antennas of a reception antenna array is 8. A transverse axis 1421 shows an SNR (dB), and a longitudinal axis 1422 shows an estimation error (°). An actual communication direction is assumed to have a random value within a range of [−60°, 60°]. A first line 1430 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1435 shows the performance of a GoB scheme of identifying a particular beam by using a plurality of beams, and then determining, as a communication direction, the boresight direction of the particular beam.

The scheme according to the first line 1430, that is, a two-stage angle estimation scheme according to various embodiments uses a total of nine beams. The beam set may include a total of seven beams. Two beams corresponding to the opposite ends of a reference beam among the seven beams may be used as an auxiliary beam pair. Therefore, for the two-stage angle estimation scheme, signaling (e.g. transmission of a beamformed reference signal and feedback on the signal) for the total of nine beams is used. In the GoB scheme, that is, the scheme according to the second line 1435, beam training is performed through 16 beams, and the second line 1435 shows the resultant performance.

As shown in the graph 1420, it may be noted that as the SNR increases, the performance of the two-stage angle estimation scheme increases compared to the GoB scheme. In addition, it may be noted that as the beams the number (9) of which is smaller than the number (16) of the beams used for the GoB scheme are used through the two-stage angle estimation scheme, the overhead is reduced and the estimation error of the two-stage angle estimation scheme is smaller than that of the GoB scheme.

Referring to FIG. 14C, a graph 1440 shows the difference in performance between a direction estimation scheme using an auxiliary beam pair and a beam set satisfying a monotonic characteristic condition and a GoB-based direction estimation scheme using an auxiliary beam pair, in the case where each of the number of antennas of a transmission antenna array and the number of antennas of a reception antenna array is 8. A transverse axis 1441 shows an SNR (dB), and a longitudinal axis 1442 shows an estimation error (°). An actual communication direction is assumed to have a random value within a range of [−60°, 60°]. A first line 1450 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1455 shows the performance of a scheme of identifying an optimal beam by using a plurality of beams, and then determining, as an auxiliary beam pair, the optimal beam and a beam having the highest channel quality among beams adjacent to the optimal beam, to determine a communication direction.

The scheme according to the first line 1450, that is, a two-stage angle estimation scheme according to various embodiments uses a total of eight beams. The beam set may include a total of six beams. Two beams corresponding to the opposite ends of a reference beam among the six beams may be used as an auxiliary beam pair. Therefore, for the two-stage angle estimation scheme, signaling (e.g. transmission of a beamformed reference signal and feedback on the signal) for the total of eight beams is used. In the GoB-based auxiliary beam pair scheme, that is, the scheme according to the second line 1455, beam training is performed through eight beams, and the second line 1455 shows the resultant performance.

Referring to FIG. 14D, a graph 1460 shows the difference in performance between a direction estimation scheme using an auxiliary beam pair and a beam set satisfying a monotonic characteristic condition and a GoB-based direction estimation scheme using an auxiliary beam pair, in the case where the number of antennas of a transmission antenna array is a 16, and the number of antennas of a reception antenna array is 8. A transverse axis 1461 shows an SNR (dB), and a longitudinal axis 1462 shows an estimation error (°). An actual communication direction is assumed to have a random value within a range of [−60°, 60°]. A first line 1470 shows the performance of direction estimation using an auxiliary beam pair after a reference beam is identified by using a beam set having a beamwidth $$\left(2\delta_t = \frac{2k\pi}{N}\right)$$

satisfying a monotonic characteristic condition, that is, Equation 2. A second line 1475 shows the performance of a scheme of identifying an optimal beam by using a plurality of beams, and then determining, as an auxiliary beam pair, the optimal beam and a beam having the highest channel quality among beams adjacent to the optimal beam, to determine a communication direction.

The scheme according to the first line 1470, that is, a two-stage angle estimation scheme according to various embodiments uses a total of nine beams. The beam set may include a total of seven beams. Two beams corresponding to the opposite ends of a reference beam among the seven beams may be used as an auxiliary beam pair. Therefore, for the two-stage angle estimation scheme, signaling (e.g. transmission of a beamformed reference signal and feedback on the signal) for the total of nine beams is used. In the GoB-based auxiliary beam pair scheme, that is, the scheme according to the second line 1475, beam training is performed through 16 beams, and the second line 1475 shows the resultant performance.

The graphs 1440 and 1460 are similar to the graphs 1400 and 1420. However, a communication direction estimation using a GoB-based auxiliary beam pair scheme provides an estimation error smaller than that of a communication direction estimation simply using a GoB scheme. Referring to the graphs 1440 and 1460, it may be noted that if an SNR greater than or equal to a predetermined level is ensured, the estimation of a communication direction having high resolution is possible.

As shown in the graph 1440, it may be noted that as the SNR increases, the performance of the two-stage angle estimation scheme increases compared to the GoB-based auxiliary beam pair scheme. It may be noted that the two-stage angle estimation scheme can provide an estimation error smaller than that of the GoB-based auxiliary beam pair scheme while using the same number of beams as that of the GoB-based auxiliary beam pair scheme.

As shown in the graph 1460, it may be noted that as the SNR increases, the performance of the two-stage angle estimation scheme increases compared to the GoB-based auxiliary beam pair scheme. In addition, it may be noted that as the beams the number (9) of which is smaller than the number (16) of the beams used for the GoB-based auxiliary beam pair scheme are used through the two-stage angle estimation scheme, the overhead is reduced and the estimation error of the two-stage angle estimation scheme is smaller than that of the GoB scheme.

A two-stage direction estimation scheme of the disclosure includes a first stage of identifying an optimal beam by performing beam training through a beam set by an apparatus, and a second stage of estimating a communication direction by using an auxiliary beam pair determined by the identified beam. The disclosure has been described such that a beam training procedure, which is the first stage, or a direction estimation procedure, which is the second stage, includes transmission of beamformed signals and feedback on the signals, but the implementation range of the disclosure is not limited thereto. In an environment (e.g. time duplex division (TDD)) satisfying channel reciprocity, direction estimation without feedback may be performed. For example, the base station 110 of FIG. 1 may perform reception beam sweeping through signals transmitted by the terminal 120 and determine an auxiliary beam pair from an optimal reception beam. For another example, the base station 110 may determine an auxiliary beam pair for determining an AoA, from an optimal transmission beam among beams of the base station.

In the disclosure, although the expression "equal to or more than" or "equal to or less than" is used in order to determine whether or not a particular condition is fulfilled, this is only an example and does not exclude the expression "more than" or "less than" The expression "equal to or more than" can be replaced with "more than", the expression "equal to or less than" can be replaced with "less than", and the expression "equal to or more than and less than" can be replaced with "more than and equal to or less than" in the conditions above.

Methods according to embodiments stated in claims and/or specifications of the disclosure may be implemented in hardware, software, or a combination of hardware and software.

When the methods are implemented by software, a computer-readable storage medium for storing at least one program (software module) may be provided. The one or more programs stored in the computer-readable storage medium may be configured for execution by one or more processors within an electronic device. The at least one program may include instructions that cause the electronic device to perform the methods according to embodiments as defined by the appended claims and/or disclosed herein.

The program (software module or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of individual memories may be included.

In addition, the program may be stored in an attachable storage device which is accessible through communication networks such as the Internet, Intranet, local area network (LAN), wide area network (WAN), and storage area network (SAN), or a combination thereof. Such a storage device may access an apparatus performing an embodiment via an external port. Further, a separate storage device on the communication network may access an apparatus performing an embodiment.

In the above-described detailed embodiments, an element included in the disclosure is expressed in the singular or the plural according to the detailed embodiments described above. However, the singular form or plural form is selected for convenience of description suitable for the given situation, and the disclosure is not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first apparatus in a wireless communication system, the method comprising:
   transmitting signals by using a beam set;
   receiving a signal for indicating at least one beam of the beam set from a second apparatus;
   identifying a reference direction based on the signal for indicating the at least one beam;
   transmitting reference signals to the second apparatus by using an auxiliary beam pair;
   receiving feedback information relating to the auxiliary beam pair from the second apparatus; and
   determining, based on the feedback information, a communication direction relating to the second apparatus,
   wherein the auxiliary beam pair in respect to the reference direction is determined based on a number of antennas of an antenna array.

2. The method of claim 1,
   wherein beams of the auxiliary beam pair include a first beam and a second beam, and
   wherein a direction of the first beam and a direction of the second beam are determined based on an angle between the reference direction and each of the direction of the first beam and the direction of the second beam.

3. The method of claim 2, wherein the angle is determined according to $k\pi/N$, N is the number of antennas of the antenna array, and k is an integer greater than or equal to 1.

4. The method of claim 1, further comprising:
   determining a coverage;
   determining a beamwidth based on the coverage and a number of beams; and
   determining the beam set based on the beamwidth,
   wherein the beamwidth is determined based on the number of antennas of the antenna array.

5. The method of claim 4, wherein the beamwidth is determined to be a multiple of 2 $k\pi/N$, N is the number of the antennas of the antenna array, k is an integer greater than or equal to 1, and an angle between directions of the beams of the auxiliary beam pair is 2 $k\pi/N$.

6. The method of claim 1,
   wherein beams of the auxiliary beam pair include a first beam and a second beam, and
   wherein the first beam and the second beam of the auxiliary beam pair are symmetrical to each other in respect to the reference direction.

7. The method of claim 6, wherein the feedback information includes information relating to a channel quality of a first reference signal transmitted by using the first beam of the auxiliary beam pair and information relating to a channel quality of a second reference signal transmitted by using the second beam of the auxiliary beam pair.

8. The method of claim 7, wherein the determining of the communication direction comprises determining the communication direction, based on the reference direction of a reference beam, the channel quality of the first reference signal, and the channel quality of the second reference signal.

9. The method of claim 6,
   wherein the auxiliary beam pair includes two beams corresponding to opposite end directions of a reference beam, and wherein a beamwidth of the reference beam is determined based on a multiple of 2 kπ/N, N is the number of antennas of the antenna array configured to form the auxiliary beam pair, k is an integer greater than or equal to 1.

10. The method of claim 9, further comprising:
determining an additional auxiliary beam pair,
wherein an angle between directions of beams of the additional auxiliary beam pair is 2 kπ/N.

11. A first apparatus in a wireless communication system, the first apparatus comprising:
an antenna array;
at least one transceiver coupled to the antenna array; and
at least one processor,
wherein the at least one processor is configured to control the at least one transceiver to:
transmit signals by using a beam set,
receive a signal for indicating at least one beam of the beam set from a second apparatus,
identify a reference direction based on the signal for indicating the at least one beam,
transmit reference signals to the second apparatus by using an auxiliary beam pair, and
receive feedback information relating to the auxiliary beam pair from the second apparatus,
wherein the at least one processor is further configured to determine a communication direction relating to the second apparatus, based on the feedback information, and
wherein the auxiliary beam pair in respect to the reference direction is determined based on a number of antennas of the antenna array.

12. The first apparatus of claim 11,
wherein beams of the auxiliary beam pair include a first beam and a second beam, and
wherein a direction of the first beam and a direction of the second beam are determined based on an angle between the reference direction and each of the direction of the first beam and the direction of the second beam.

13. The first apparatus of claim 12, wherein the angle is determined according to kπ/N, N is the number of antennas of the antenna array, and k is an integer greater than or equal to 1.

14. The first apparatus of claim 11, wherein the at least one processor is further configured to:
determine a coverage,
determine a beamwidth, based on the coverage and a number of beams, and
determine the beam set, based on the beamwidth,
wherein the beamwidth is determined based on the number of antennas of the antenna array.

15. The first apparatus of claim 14, wherein the beamwidth is determined to be a multiple of 2 kπ/N, N is the number of antennas of the antenna array, k is an integer greater than or equal to 1, and an angle between directions of the beams of the auxiliary beam pair is 2 kπ/N.

16. The first apparatus of claim 11,
wherein beams of the auxiliary beam pair include a first beam and a second beam, and
wherein the first beam and the second beam are symmetrical to each other in respect to the reference direction.

17. The first apparatus of claim 16, wherein the feedback information includes information relating to a channel quality of a first reference signal transmitted by using the first beam of the auxiliary beam pair and information relating to a channel quality of a second reference signal transmitted by using the second beam of the auxiliary beam pair.

18. The first apparatus of claim 17, wherein the at least one processor is further configured to, in order to determine the communication direction:
determine the communication direction, based on the reference direction of a reference beam, the channel quality of the first reference signal, and the channel quality of the second reference signal.

19. The first apparatus of claim 16,
wherein the auxiliary beam pair includes two beams corresponding to opposite end directions of a reference beam, and
wherein a beamwidth of the reference beam is determined based on a multiple of 2 kπ/N, N is the number of antennas of the antenna array configured to form the auxiliary beam pair, and k is an integer greater than or equal to 1.

20. The first apparatus of claim 19, wherein the at least one processor is further configured to determine an additional auxiliary beam pair, and an angle between directions of beams of the additional auxiliary beam pair is 2 kπ/N.

* * * * *